United States Patent [19]

Suzuki et al.

[11] Patent Number: 5,331,032

[45] Date of Patent: Jul. 19, 1994

[54] HYDROPHILIC AROMATIC POLYESTER FIBER

[75] Inventors: Togi Suzuki, Matsuyama; Shigeo Mori, Kyoto; Noboru Chujo, Joyo, all of Japan

[73] Assignees: Teijin Limited, Osaka; Dai-ichi Kogyo Seiyaku Co., Ltd., Kyoto, both of Japan

[21] Appl. No.: 100,462

[22] Filed: Jul. 30, 1993

Related U.S. Application Data

[60] Division of Ser. No. 672,956, Mar. 21, 1991, Pat. No. 5,262,460, which is a continuation-in-part of Ser. No. 474,761, Mar. 29, 1990, abandoned.

[30] Foreign Application Priority Data

| Aug. 4, 1988 | [JP] | Japan | 63-193487 |
| Apr. 11, 1989 | [JP] | Japan | 1-89808 |
| Apr. 18, 1989 | [JP] | Japan | 1-96453 |
| Apr. 19, 1989 | [JP] | Japan | 1-97449 |
| Jul. 10, 1989 | [JP] | Japan | 1-175707 |
| Dec. 12, 1989 | [JP] | Japan | 1-320559 |
| Feb. 2, 1990 | [JP] | Japan | 2-24060 |

[51] Int. Cl.$^5$ ............................................. C08K 5/53
[52] U.S. Cl. ...................... 524/135; 525/411; 525/437
[58] Field of Search ............... 524/135; 525/411, 437

[56] References Cited

U.S. PATENT DOCUMENTS

| 3,560,591 | 2/1971 | Tanaka et al. | 260/860 |
| 4,357,390 | 11/1982 | Ozaki et al. | 428/398 |

FOREIGN PATENT DOCUMENTS

| 35-39413 | 3/1960 | Japan . |
| 39-5214 | 4/1964 | Japan . |
| 44-31828 | 12/1969 | Japan . |
| 53-80497 | 7/1978 | Japan . |
| 60-11944 | 3/1985 | Japan . |
| 60-56802 | 12/1985 | Japan . |

Primary Examiner—Paul R. Michl
Assistant Examiner—Edward Cain
Attorney, Agent, or Firm—Burgess, Ryan & Wayne

[57] ABSTRACT

An aromatic polyester shaped article, for example, a fiber, a film or a sheet, having excellent hydrophilic characteristics and a durable antistatic property, sweat-absorbing property and soil-releasing property, is prepared from an aromatic polyester composition comprising (a) 100 parts by weight of an aromatic polyester resin, (b) 0.2 to 30 parts by weight a water-insoluble polyoxyethylene type polyether represented by the formula (I):

$$Z + (CH_2CH_2O)_l - (R^1O)_m - R^2]_k \quad (I)$$

wherein Z is a residue of an organic compound having 1 to 6 active hydrogen atoms and a molecular weight of 300 or less, $R^1$ is an unsubstituted or substituted alkylene group having at least 6 carbon atoms, $R^2$ is H, a monovalent hydrocarbon group having 1 to 40 carbon atoms, or a monovalent acyl group having 2 to 40 carbon atoms, k is 1 to 6, l satisfies the relationship: k × l ≧ 70 and m is 1 or more, and having a number average molecular weight of 5000 to 16000, said $R^1$, $R^2$, l and m in the formula (I) satisfying the following relationships:

when $k = 1$, $$0.4 < \frac{m[M(R^1O)] + [M(R^2)]}{44l} < 3.0$$

and when $k = 2$ to 6, $$0.23 < \frac{m[M(R^1O)] + [M(R^2)]}{44l} < 3.0$$

wherein $[M(R^1O)]$ is a molecular weight of the $R^1O$ and $[M(R^2)]$ is a molecular weight of the $R^2$.

24 Claims, No Drawings

HYDROPHILIC AROMATIC POLYESTER FIBER

CROSS REFERENCE TO RELATED APPLICATION

This is a division of application Ser. No. 672,956, filed Mar. 21, 1991, U.S. Pat. No. 5,262,460, which is a continuation-in-part of our application Ser. No. 07/474,761, filed on Mar. 29, 1990, now abandoned.

BACKGROUND OF THE INVENTION

1) Field of the Invention

The present invention relates to an aromatic polyester resin composition and fiber. More particularly, the present invention relates to an aromatic polyester composition having an extremely durable antistatic property, sweat-absorbing property, soil-releasing property and hydrophilic property, which is useful for the production of shaped articles such as a fiber, film and sheet, and to a fiber made therefrom.

2) Description of the Related Arts

An aromatic polyester resin has many excellent characteristics, and therefore, the resin is used as a material for the production of shaped articles such as a fiber, a film and a sheet. But since the aromatic polyester resin is hydrophobic, the use of the aromatic polyester resin in fields where hydrophilic characteristics such as an antistatic property, sweat-absorbing property and soil-releasing property are required is restricted.

Attempts have been made to impart hydrophilic characteristics to the aromatic polyester resins, to manifest such functions as an antistatic property, sweat-absorbing property and soil-releasing property, and many proposals have been made to this end. As one attempt to impart antistatic characteristics to a polyester fiber, a method is known which comprises incorporating a polyoxyalkylene glycol into a polyester (see, for example, Japanese Examined Patent Publication No. 39-5214). In this method, however, to impart a sufficient antistatic property to the polyester fiber, it is necessary to add a polyoxyalkylene glycol in a large amount such as 15 to 20% by weight, and therefore, the physical properties, especially thermal properties, of the resultant antistatic polyester fiber are greatly lowered and the washing fastness is poor. Accordingly, this antistatic polyester fiber cannot be put to practical use.

As the means for overcoming this defect, a method is known which comprises the steps of mixing, a polyester resin with a polyoxyalkylene glycol, a polyoxyalkylene glycol/polyamide block copolymer or a polyoxyalkylene glycol/polyester block copolymer, which is substantially incompatible with the polyester resin, and further mixing with an organic or inorganic ionic compound (see, for example, Japanese Examined Patent Publication No. 44-31828, Japanese Examined Patent Publication No. 60-11944, Japanese Unexamined Patent Publication No. 53-80497 and Japanese Unexamined Patent Publication No. 60-39413). According to this method, the total amount of the antistatic agent to be used can be reduced, and therefore, an antistatic polyester, in which the reduction of the physical properties is relatively small, can be obtained. Nevertheless, the antistatic polyester fiber obtained according to this method is defective in that the chemical performance, for example, color fastness thereof, is easily lost. Furthermore, if this polyester fiber is subjected to a weight-reducing alkali treatment usually conducted for improving the touch, especially a weight-reducing treatment where the weight-reducing ratio is at least 20% by weight, which is necessary for manifestation of a silk-like touch, the antistatic property thereof is easily lost at the subsequent dyeing step usually conducted at a temperature of 120° to 135° C. Accordingly, this polyester fiber cannot be practically used in fields where an antistatic property is required.

Furthermore, there has been attempted a method in which a polyester resin composition containing a small amount (3% by weight at largest) of an antistatic agent substantially incompatible with the polyester resin, and consisting of a polyoxyalkylene glycol and a metal salt of sulfonic acid, is melt-spun into a hollow fiber, whereby the majority of the added antistatic agent is concentrated and predominantly distributed in the inside surface portion around the hollow of the hollow fiber and it is possible to improve the touch by a weight-reducing alkali treatment (see Japanese Examined Patent Publication No. 60-56802). To impart sufficient antistatic characteristics to a polyester fiber according to this method, however, it is necessary to strictly control the fiber-forming conditions and the like and restrict the bleed-out of the antistatic agent to the inside surface portion around the hollow of the hollow fiber. This necessity results in that the fiber-producing cost is increased. Furthermore, if this polyester fiber is subjected to a weight-reducing alkali treatment and the weight of the fiber is reduced to at least 15% by weight, the imparted antistatic characteristics of the fiber are easily lost in the subsequent dyeing operation. Moreover, this polyester fiber is defective in that, since the fiber has the hollow portion, when this polyester is dyed the color depth or color vividity of the resultant dyed fiber is unsatisfactory.

Separately, in a core-in-sheath type conjugate fiber, it has been attempted to distribute an antistatic agent at a high concentration predominantly in a core portion of the core-in-sheath type conjugate fiber and to render a weight-reducing alkali treatment possible (see, for example, Japanese Examined Patent Publication No. 61-6883, Japanese Unexamined Patent Publication No. 55-122020 and Japanese Unexamined Patent Publication No. 61-28016). But this fiber is a conjugate fiber, and thus is defective in that the fiber-producing cost is drastically increased. Moreover, the antistatic property of the resultant fiber is unsatisfactory.

Furthermore, an antistatic resinous composition comprising about 3 to 30% by weight of a high molecular weight ethylene oxide copolymer having an average molecular weight of 20,000 or more and 70 to 97% by weight of a high molecular material is disclosed by Japanese Unexamined Patent Publication No. 64-26674. This Japanese publication discloses that propylene oxide and 1,2-dodecylene oxide are usable as a comonomer to be copolymerized with the ethylene oxide.

In this attempt, since the high molecular weight ethylene oxide copolymer is utilized as a antistatic agent, when this is applied to the aromatic polyester resin, the bleed out of the antistatic agent is restricted, and accordingly the resultant aromatic polyester resin composition does not exhibit a satisfactory initial antistatic property.

Also, the ethylene oxide copolymers specifically disclosed in the Japanese publication are all random copolymers and water-soluble or water-dispersible, and therefore, when the ethylene oxide copolymers are utilized to produce fibers, the resultant fibers exhibit a poor resistance to hot water, alkali and laundering, and an unsatisfactory durability of the antistatic property, and thus cannot be practically employed.

Furthermore, other attempts have been made to impart hydrophilic characteristics such as an antistatic property, sweat-absorbing property, and soil-releasing property by a finishing treatment. For example, there are known a method comprising applying a hydrophilic polymeric compound to the surface of a fiber (see, for example, Japanese Examined Patent Publication No. 53-47437), and a method comprising polymerizing a polymerizable monomer having a hydrophilic group on the surface of a fiber to form a coating (see, for example, Japanese Unexamined Patent Publication No. 53-130396). If hydrophilic fibers obtained according to these methods are repeatedly subjected to a severe washing treatment, however, the imparted effects are often lost, and if the amount of treating agent applied is increased to improve the durability of the hydrophilic characteristics, the touch of the resultant fiber becomes coarse and rigid and the color fastness becomes poor. For examples, when a polyester fiber is used for a thin woven fabric useful for, for example, a dress or blouse for which a soft touch is required, the polyester fiber is frequently subjected to a weight-reducing treatment with an alkali. If the polyester fiber, which has been subjected to the weight-reducing alkali treatment, is subjected to the above-mentioned finishing treatment, a problem arises in that the durability of the resultant treatment effect becomes poor.

As apparent from the foregoing description, a solid nonhollow, non-conjugate type fiber made of an antistatic polyester resin, which is modified so that the fiber can endure a weight-reducing alkali treatment resulting in a large reduction of the weight, is not presently available. Moreover, the finishing treatment technique is limited, and therefore, development of an antistatic polyester solid fiber capable of enduring a severe weight-reducing alkali treatment causing a weight reduction of at least 20% by weight, which is necessary for improving the touch, is urgently required.

As the means for imparting a water-absorbing property (the capacity of absorbing water in the liquid state) to a polyester fiber, there have been proposed the above-mentioned method comprising forming a hydrophilic coating film on the surface of a polyester fiber, and a method comprising subjecting a polyester fiber to an electric discharge treatment, a method comprising graft-polymerizing a hydrophilic compound such as acrylic acid or methacrylic acid to a polyester fiber, and a method comprising etching the surface of a polyester fiber with a chemical. Moreover, there has been attempted a method in which a polyester fiber is rendered porous and the water-absorbing property thereof is improved by utilizing the capillary phenomenon thereof.

Many investigations have been made into methods of imparting a moisture-absorbing property (the capacity of absorbing water in the vapor state), for example, the above-mentioned method in which the polyester is co-polymerized with a polyoxyalkylene glycol, but the effect of improving the moisture-absorbing property by the copolymerization with a polyoxyalkylene glycol is poor and the reduction in the heat resistance and light resistance is conspicuous, and therefore, a product that can be practically used is not obtained. A moisture-absorbing polyester fiber having a moisture absorption comparable to that of cotton, which is prepared by graft-polymerizing acrylic acid or methacrylic acid to a polyester fiber and converting the grafted component to a sodium salt thereof, has been attempted, but this type of polyester fiber is defective in that the moisture-absorbing property thereof is easily lost by washing, the reduction in the color fastness thereof is conspicuous, and the touch becomes hard. Accordingly, this type of polyester fiber cannot be put to practical use.

Moreover, there has been attempted a method in which a moisture-absorbing polyester fiber having a porous structure and exhibiting a capillary condensing action is formed by steam-drawing an undrawn fiber of a polyester resin containing a specific oxalic acid complex salt incorporated therein (see Japanese Unexamined Patent Publication No. 54-93121), but since the oxalic acid complex salt is easily soluble in water, if this polyester fiber is subjected to high-pressure dyeing or washing procedure, the moisture-absorbing property of the fiber is easily lost, and thus this type of polyester fiber cannot be put to practical use.

In view of the importance of the capillary condensation type of polyester fiber, we have heretofore made several approaches concerning moisture-absorbing polyester fibers (see Japanese Unexamined Patent Publication No. 60-155770, Japanese Unexamined Patent Publication No. 60-167969, Japanese Unexamined Patent Publication No. 61-215770 and Japanese Unexamined Patent Publication No. 61-231221 ). In the capillary condensation type of moisture-absorbing polyester fibers, however, since fine pore-forming agents contained in these fibers are water-soluble, a reduction of the moisture-absorbing property by a high-pressure dyeing or washing procedure cannot be avoided. Accordingly, development of the capillary condensation type of a moisture-absorbing polyester fiber having a high durability to high-pressure dyeing and laundering is urgently required.

The inventors of the present invention have made an attempt to provide a hydrophilic polyester fiber having excellent mechanical properties, alkali resistance and laundering resistance, by replacing the water-soluble polyoxyethylene glycol conventionally used to provide antistatic polyester fibers by a water-insoluble polyoxyethylene polyether polymer which is a copolymerization product of ethylene oxide with a specific higher olefin oxide.

Nevertheless, it was found that the above-mentioned type of antistatic polyester fibers are not satisfactory in that, when the antistatic polyester fibers were subjected to an alkali treatment with a weight reduction of 20% or more, and then to a 30 times laundering treatment, it is difficult for the treated polyester fibers to satisfy all of the requirements of a high durability of the antistatic property, dyeing property evaluated by naked eye observation, and abrasion resistance.

In the above-mentioned attempt, the durability of the antistatic property of the polyester fiber was tested in such a manner that one test cycle consisting of one laundering treatment and one heat treatment at a temperature of 170° C. for one minute, and this cycle was repeated to a predetermined number of times. In this test method, the polyoxyethylene polyether polymer is bled-out from the inside to the surface of the fiber during the heat treatment, and therefore, the evaluated durability of the antistatic property of the polyester fiber in appeared to be better than that evaluated by another test method in which no heat-treatment but only the laundering treatment is applied.

The antistatic polyester fibers, which can be subjected to a weight-reduction treatment with alkali, are mainly used for lining fabric and lingerie. In this use, the polyester fiber fabric is not always heat treated after the laundering treatment. Therefore, sometimes the above-mentioned polyester fiber fabric cannot exhibit a satisfactory antistatic property, due to the lack of bleed-out of the antistatic agent.

Accordingly, there is a need to provide a polyester fiber which exhibits a satisfactory antistatic property even when the fiber is not heat treated, and a high durability of the antistatic property.

SUMMARY OF THE INVENTION

An object of the present invention is to provide a polyester resin composition that can be formed into a shaped article, such as a fiber, which shows hydrophilic characteristics such an antistatic property, sweat-absorbing property and soil-releasing property, which are highly durable against a high weight-reducing alkali treatment and a repeated severe washing treatment, and a fiber thereof.

Another object of the present invention is to provide a polyester resin composition exhibiting an excellent moisture-absorbing property in an atmosphere with a high relative humidity, this moisture-absorbing property being sufficiently durable against high-pressure dyeing or repeated washing procedures, which can be formed into a clothing which has a superior comfort when worn and a sufficiently satisfactory practical quality, and a fiber thereof.

The above-mentioned objects can be attained by the aromatic polyester resin composition of the present invention, which comprises (a) 100 parts by weight of an aromatic polyester resin and (b) 0.2 to 30 parts by weight of a water-insoluble polyoxyethylene polyether polymer, said water-insoluble polyoxyethylene polyether polymer satisfying all of the requirements (i) to (iii):

(i) the polyoxyethylene polyether polymer is a non-random copolymer type polyoxyethylene polyether polymer represented by the formula (I):

$$Z + (CH_2CH_2O)_l - (R^1O)_m - R^2]_k \quad (I)$$

wherein Z represents a residue of an organic compound having 1 to 6 active hydrogen atoms and a molecular weight of 300 or less, $R^1$ represents an unsubstituted or substituted alkylene group having at least 6 carbon atoms, $R^2$ represents a member selected from a hydrogen atom, a monovalent hydrocarbon groups having 1 to 40 carbon atoms, and monovalent acyl groups having 2 to 40 carbon atoms, k represents an integer of from 1 to 6, l represents an integer satisfying the relationship of $k \times l \geq 70$, and m is an integer of 1 or more;

(ii) the polyoxyethylene type polyether has a number average molecular weight of 5000 to 16000; and (iii) in the formula (I), $R^1$, $R^2$, l and m satisfy the following relationships: when k represents an integer of 1, $$0.4 < \frac{m[M(R^1O)] + [M(R^2)]}{441} < 3.0$$

and when k represents an integer of 2 to 6, $$0.23 < \frac{m[M(R^1O)] + [M(R^2)]}{441} < 3.0$$

wherein $[M(R^1O)]$ represents a molecular weight of the radical $R^1O$ and $[M(R^2)]$ represents a molecular weight of the radical $R^2$.

DESCRIPTION OF THE PREFERRED EMBODIMENTS

The inventors of the present invention conducted research into hydrophilic polyester resin compositions and fibers with a view to attaining the above-mentioned objects, and as a result, found that polyoxyethylene glycol practically used for conventional antistatic polyester fibers is inherently water-soluble and naturally soluble in an alkaline aqueous solution, and therefore, has a poor durability, and that in polyoxyethylene glycol/polyester block copolymers, polyoxyethylene glycol/polyamide block copolymers and polyoxyethylene glycol/polyester/polyamide block copolymers, the hydrophilic characteristics thereof tend to reduce with increase in the water insolubility thereof. Accordingly, the inventors of the present invention noted this tendency and tried to solve the above-mentioned problems by using a novel water-insoluble polyoxyethylene type polyether having antinomic properties, that is, a hydrophilic property and a water insolubility. Based on this idea, many compounds were synthesized and various experiments on the compounds were repeated. This was successful in providing a water-insoluble polyoxyethylene type polyether by copolymerizing ethylene oxide with a specific higher olefin oxide, and it was found that the above-mentioned problem can be eliminated by the water-insoluble polyoxyethylene type polyether. More specifically, a polyester fiber, in which a water-insoluble polyoxyethylene type polyether having both of a high hydrophilic property and a water insolubility is dispersed, can maintain substantially sufficient strength, fibrillation resistance, heat resistance and other physical properties even after the polyester fiber is subjected to such a high alkali weight-reducing treatment as causing a weight reduction of at least 20% by weight for improving the touch. To our surprise, this polyester fiber retains a good antistatic property even after the dyeing operation, and an excellent washing fastness is maintained. The dyed product of this hydrophilic polyester fiber has excellent color vividity and color fastness. Furthermore, it was found that the polyester fiber of the present invention has a very high potential as an antistatic polyester fiber even in the form of regular non-hollow fiber without being formed into a hollow fiber or core-sheath conjugate fiber. Moreover, the polyester fiber of the present invention has not only an excellent antistatic property but also an excellent sweat-absorbing property (wicking property) or soil-releasing property.

Still further, it was found that the water-insoluble polyoxyethylene type polyether used in the present invention has a milder mutual action to a polyester than that of a water-soluble polyoxyethylene type polyether, and therefore, even if the content of this water-insoluble polyether is increased, the reduction of the physical properties of the polyester composition is very small.

Based on these findings, the inventors of the present invention made detailed investigations of a polyether copolymer comprising ethylene oxide and a higher olefin oxide, especially relations of the kind of the higher olefin oxide component, the composition of the obtained copolymer, the polymerization degree of the copolymer and the random or block structure of the copolymer to the water solubility of the copolymer and the characteristics of the polyester composition comprising this polyether copolymer dispersed therein.

As a result of these investigations it was further found that, when the water-insoluble polyoxyethylene polyether polymer satisfies specific requirements, and exhibits specifically balanced hydrophilic property and hydrophobic property, the resultant polyester composition and fiber exhibit an enhanced durability of the antistatic property and hydrophilic property.

The mechanism of exhibiting the enhanced durability of the antistatic property is not completely clear, but it is assumed that the enhanced durability is derived from a complicated combination of the specific level of the hydrophilic property of the water-insoluble polyether polymer with the dispersing condition of the water-insoluble polyether polymer in the polyester resin matrix, the interface affinity of the polyether polymer dispersoid with the polyester resin matrix, the bleed-out property of the polyether polymer, and the dissolving property of the polyether polymer in hot water, hot alkali aqueous solution, and laundry liquid. The present invention is based on the results of these findings.

The aromatic polyester resin composition of the present invention comprises (a) 100 parts by weight of an aromatic polyester and (b) 0.2 to 30 parts by weight of a water-insoluble polyoxyethylene type polyether polymer.

The aromatic polyester resin usable for the present invention comprises, as a main component, an aromatic polyester having aromatic rings in repeating chain units of the polymer. This polymer is obtained by reacting a dicarboxylic acid component comprising a bifunctional aromatic carboxylic acid or an ester-forming derivative thereof with a diol component comprising a diol or an ester-forming derivative thereof.

As preferable examples of the bifunctional aromatic carboxylic acid, there can be mentioned terephthalic acid, isophthalic acid, orthophthalic acid, 1,5-naphthalene-dicarboxylic acid, 2,5-naphthalene-dicarboxylic acid, 2,6-naphthalene-dicarboxylic acid, 4,4'-biphenyl-dicarboxylic acid, 3,3'-biphenyl-dicarboxylic acid, 4,4'-diphenylether-dicarboxylic acid, 4,4'-diphenylmethane-dicarboxylic acid, 4,4'-diphenyl-sulfone-dicarboxylic acid, 1,2-bis(phenoxy)ethane-4,4'-dicarboxylic acid, 2,5-anthracene-dicarboxylic acid, 2,6-anthracene-dicarboxylic acid, 4,4'-p-terphenylene-dicarboxylic acid, 2,5-pyridine-dicarboxylic acid, β-hydroxyethoxybenzoic acid and p-hydroxybenzoic acid. Terephthalic acid is especially preferred.

The dicarboxylic acid component may comprise at least two members selected from the above-mentioned bifunctional aromatic carboxylic acids. Note, the dicarboxylic acid component may comprise, in addition to the above-mentioned bifunctional aromatic carboxylic acid, at least one member selected from the group consisting of bifunctional aliphatic acids such as adipic acid, azelaic acid, sebacic acid and dodecanedionic acid, bifunctional alicyclic carboxylic acids, such as cyclohexane-dicarboxylic acid, and 5-sodium-sulfoisophthalic acid, if the amount thereof is small.

As preferred examples of the diol compound, an aliphatic diol such as ethylene glycol, propylene glycol, butylene glycol, hexylene glycol, neopentyl glycol, 2-methyl-1,3-propane-diol, diethylene glycol and trimethylene glycol, an alicyclic diol such as 1,4-cyclohexane-dimethanol, and mixtures of two or more thereof can be used. Furthermore, a small amount of a polyoxyalkylene glycol having one or two terminals unblocked can be polymerized together with the above-mentioned diol compound.

Moreover, a polycarboxylic acid such as trimellitic acid or pyromellitic acid and a polyol such as glycerol, trimethylolpropane or pentaerythritol can be used, so far as the resultant polyester polymer molecule is substantially linear.

As preferred examples of the aromatic polyester, homopolyesters such as polyethylene terephthalate, polybutylene terephthalate, polyhexylene terephthalate, polyethylene naphthalate, polybutylene naphthalate and polyethylene-1,2-bis(phenoxy)ethane-4,4'-dicarboxylate, and copolyesters such as polyethylene terephthalate/isophthalate, polybutylene terephthalate/isophthalate and polybutylene terephthalate/decane-dicarboxylate can be used. Among them, a polyethylene terephthalate resin and a polybutylene terephthalate resin are especially preferable, because they have well-balanced mechanical properties and shapeability.

The aromatic polyester resin of the present invention can be synthesized by a conventional process. For example, the preparation of a polyethylene terephthalate resin will now be described. This polymer can be easily prepared through a first stage reaction for producing a glycol ester of terephthalic acid and/or an oligomer thereof by directly esterifying terephthalic acid with ethylene glycol, carrying out an ester-exchange reaction of a lower alkyl ester of terephthalic acid such as dimethyl terephthalate with ethylene glycol, or reacting terephthalic acid with ethylene oxide, and a second stage reaction for polycondensing the above-mentioned product by heating under a reduced pressure until a desired degree of polymerization is attained.

In the composition of the present invention, a water-insoluble polyoxyethylene type polyether polymer is incorporated into the above-mentioned aromatic polyester resin. In the present invention, the water insolubility of the polyoxyethylene type polyether polymer refers to such a property that when 5 g of a sample is added into 100 g of pure water, and the mixture is stirred at 100° C. for 60 minutes, naturally cooled to room temperature and then naturally filtered through a filter paper sheet of type 5A, JIS, at least 90% by weight of the sample is separated by the filtration.

The polyoxyethylene polyether polymer usable for the present invention must be a non-random copolymer type polyoxyethylene polyether polymer of the general formula (I):

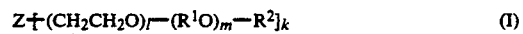

$$Z\!+\!(CH_2CH_2O)_l\!-\!(R^1O)_m\!-\!R^2]_k \qquad (I)$$

In the above-mentioned formula, Z represents a residue of an organic compound having 1 to 6 active hydrogen atoms. For example, there can be included residues of hydroxyl group-containing compounds such as methanol, ethanol, propanol, butanol, phenol, ethylene glycol, bisphenol A, propylene glycol, butylene glycol, butanediol, glycerol, trimethylolpropane, neopentyl glycol, triethanolamine, diglycerol, pentaerythritol and sorbitol, and residues of primary and secondary amine compounds such as ethylenediamine, hexamethylenediamine and diethylenetriamine. A residue of a hydroxyl group-containing compound is preferable. In the formula (I), $R^1$ represents an unsubstituted alkylene group or substituted alkylene group having at least 6 carbon atoms. The substituted alkylene group having 6 to 50 carbon atoms is especially preferable for $R^1$. As preferable specific examples of $R^1$, there can be mentioned a cyclohexyl group, a phenylethylene group, a hexylethylene group, a methylpentylethylene group, a heptylethylene group, a methylhexylethylene group, and alkylethylene groups each having 12 to 40 carbon atoms. $R^1$ may be a mixture of two or more of the above-mentioned groups. In the formula (I), $R^2$ represents a hydrogen atom, a monovalent hydrocarbon group having 1 to 40 carbon atoms, or a monovalent acyl group having 2 to 40 carbon atoms. As the hydrocarbon group, an alkyl group, an alkenyl group, a cycloalkyl group, an aryl group, an alkylaryl group or a hydroxyalkyl group is preferable. An alkanoxyl group, an alkenoyl group, a cycloalkylcarbonyl group, an arylcarbonyl group and an alkylarylcarbonyl group are preferable as the acyl group. In the formula (I), k corresponds to the number of the active hydrogen atoms possessed by the organic compound providing the residue Z and is an integer of from 1 to 6, and l should be an integer satisfying the relationship: $k \times l \geq 70$, and may be the same or different among the molecules or in the molecule. In case of $k \times l < 70$, in the finally obtained shaped article of the polyester resin composition, properties attributed to the hydrophilic characteristics, such as the alkali durability of the antistatic property, are insufficient.

The hydrophilic property and the durability thereof of the resultant shaped polyester composition article is enhanced with an increase in the value of $k \times l$, but if the value of $k \times l$ exceeds 300, no further improvement of the hydrophilic property and durability thereof is attained in the obtained composition and shaped article therefrom, but the water insolubilization of the polyoxyethylene type polyether polymer tends to be difficult. Accordingly, preferably the value of $k \times l$ is an integer not exceeding 300, and most preferably $k \times l$ is in the range of from 80 to 200. In the above-mentioned formula (I), m is an integer of 1 or more, and may be the same or different among the molecules or in the molecule. In the number k of branched chains bonded to the group Z, m must be 1 or more. If the polyether polymer has a branched chain in which m is 0, the resultant polyether polymer exhibits an unsatisfactory water-insolubility.

Arrangement sequences of $CH_2CH_2O$ units and $R^1O$ units contained in the polyoxyethylene type polyether polymer usable for the present invention are important. The polyoxyethylene block consisting of the recurring units of $—CH_2CH_2O—$ forms a backbone chain of the polymer molecule and the backbone chain is terminated with a block consisting of one or two units of $—R^1O—$. That is $R^1O$ units are present locally in the terminals of the polymer molecule. In this specific location of the $R^1O$ units, the degree of the water insolubilization of the water-insoluble polyoxyethylene type polyether can be increased, and furthermore, the hydrophilic characteristics can be enhanced by an introduction of a small amount of $R^1O$ units.

If the $CH_2CH_2O$ units and the $R^1O$ units are arranged in random in the polyether polymer molecule, the specific properties of the aromatic polyester composition of the present invention are not attained.

In the polyester composition of the present invention, the water-insoluble polyoxyethylene polyether polymer must have a specific number average molecular weight of 5,000 to 16,000, and $R^1$, $R^2$, l and m in the formula (I) must satisfy the specific relationships (A) and (B):

(A) when k represents an integer of 1, $$0.4 < \frac{m[M(R^1O)] + [M(R^2)]}{44l} < 3.0$$

and (B) when k represents an integer of 2 to 6, $$0.23 < \frac{m[M(R^1O)] + [M(R^2)]}{44l} < 3.0$$

wherein $[M(R^1O)]$ represents a molecular weight of the radical $R^1O$ and $[M(R^2)]$ represents a molecular weight of the radical $R^2$, in addition to the above-mentioned requirement for the molecular structure of the polyether polymer.

When all of the above-mentioned requirements are satisfied, the resultant aromatic polyester composition exhibits a satisfactory durability of the hydrophilic property and an excellent shapability and mechanical properties. Especially, the resultant aromatic polyester composition fiber exhibits a remarkably enhanced laundering resistance of the hydrophilic property when treated with an alkali at a weight-reduction of 20% by weight or more. Also, the satisfaction of the three requirements effectively enhances the increase in the weight reduction rate in the alkali treatment, the improvement of the dyability evaluated by naked eye observation, and the improvement of the abrasion resistant of the fiber. Therefore, the satisfaction of the above-mentioned three requirements is practically very useful.

The water insoluble polyoxyethylene polyether polymer usable for the present invention has a number average molecular weight of 5,000 to 16,000. When the number average molecular weight falls outside of the above-mentioned range, a satisfactory durability of the hydrophilic property cannot be imparted to the resultant final product. Even if the molecular weight is less than 5,000, the hydrophilic property of the final product can be enhanced by heat treating the product to cause the polyoxyethylene polyether polymer in the product to bleed out toward a surface of the product. Nevertheless, the degree of the resultant hydrophilic property is still not satisfactory.

Also, even if the content of the hydrophobic $R^1O$ units is increased, if the average molecular weight of the resultant polyoxyethylene polyether polymer is less than 5,000, the polyether polymer is easily extracted from the product when treated with hot water, a hot alkali aqueous solution or hot laundering liquid.

If the average molecular weight exceeds 16,000, the resultant polyoxyethylene polyether polymer exhibits a significantly reduced thermostability. For example, when the polyester composition is subjected to a melt-shaping process, the polyoxyethylene polyether polymer is easily decomposed to reduce the water-insolubility. Also, the polyoxyethylene polyether polymer having an average molecular weight of more than 16,000 exhibits a poor compatibility with the polyester resin, and therefore, the resultant final product exhibits a reduced durability of the hydrophilic property, and a poor mechanical property and shapability.

For example, when an alkali treatment at a weight reduction of 20% by weight or more is applied, the aromatic polyester composition product containing the polyoxyethylene polyether polymer with an average molecular weight of more than 16,000, the resultant shaped article exhibits not only an unsatisfactory durability of the hydrophilic property but also an excessively high alkali-weight reduction rate, a reduced dyeability evaluated by naked eye observation (for example, even when the shaped article is dyed with a large amount of a dye, tile resultant color depth evaluated by the naked eye is relatively low and the observed color becomes whitened).

A preferred number average molecular weight of the polyoxyethylene polyether polymer is in the range of from 5,500 to 14,000.

In the formula (I) of the polyoxyethylene polyether polymer, l, m, $R^1$ and $R^2$ must satisfy the above-mentioned relationship (A) and (B).

In the relationships (A) and (B), the value of the formula:

$$\frac{m[M(R^1O)] + [M(R^2)]}{44l} = [R]$$

indicate a certain ratio of the hydrophobic property to the hydrophilic property of the polyoxyethylene polyether polymer. Namely, in the above-mentioned formula, the numerator $m[M(R^1O)] + [M(R^2)]$ corresponds to the total weight of the hydrophobic group and the denominator 44 l corresponds to the total weight of the hydrophilic group in the polyoxyethylene polyether polymer. The number 44 corresponds to a molecular weight of a $CH_2CH_2O$ unit.

In the relationships (A) and (B), if the hydrophobic property - hydrophilic property ratio [R] is 0.4 or less and 0.23 or less, respectively, the resultant polyester composition exhibits an unsatisfactory durability of the hydrophilic property. Especially when no heat treatment is applied, the durability of the hydrophilic property of the resultant polyester composition article is significantly poor.

In each of the relationships (A) and (B), if the ratio [R] is 3.0 or more, the resultant polyoxyethylene polyether polymer exhibits an unsatisfactory hydrophilic property, and therefore, not only does the initial hydrophilic property of the shaped polyester composition article become unsatisfactory, but also the compatibility of the polyoxyethylene polyether polymer with the polyester resin is reduced to lower the dispersibility of the polyoxyethylene polyether polymer in the polyester resin, and therefore, the mechanical properties of the resultant shaped polyester composition article becomes unsatisfactory. Also, for example, when an alkali treatment at a weight reduction of 20% by weight or more is applied to the shaped polyester composition article, for example, fiber, the weight reduction rate becomes excessively high. Further, the dyeing property of the shaped article evaluated by the naked eye observation becomes poor and the abrasion resistance of the shaped article is lowered so that the surface of the shaped article is easily fibrilized. Therefore, even when a large amount of a dye is absorbed in the shaped article, the dyed article exhibits an unsatisfactory color depth and a whiten hue appears.

Preferably, in the formula (I), l, k, $R_1$ and $R_2$ satisfy the following relationships (A') and (B'):

(A') when k represents an integer of 1, $$0.5 < \frac{m[M(R^1O)] + [M(R^2)]}{44l} < 1.5$$

and (B') when k represents an integer of 2 to 6, $$0.24 < \frac{m[M(R^1O)] + [M(R^2)]}{44l} < 1.5$$

In connection with the relationships (A), (B), (A') and (B'), it should be noted that, when k=1, only one terminal of the backbone polyoxyethylene chain in the polyoxyethylene polyether polymer is blocked by a $(R_1O)_m$ group, and when k=2 to 6, all of the terminals of the backbone polyoxyethylene chain are blocked by $(R_1O)_m$ groups.

In the water-insoluble polyoxyethylene polyether polymers usable for the present invention, it is preferable that, in the formula (I), k be an integer of 2 to 6, and all of the terminals of the backbone polyoxyethylene chain are blocked by the $(R_1O)_m$ groups.

The non-random copolymer type polyoxyethylene polyether polymer usable for the present invention can be prepared by a first reaction step in which an active hydrogen-containing compound is addition reacted with ethylene oxide, a second reaction step in which the resultant addition reaction product is reacted with an olefin oxide having 6 or more carbon atoms to provide a hydroxyl-terminated compound, and optionally a third reaction step in which the terminal hydroxyl groups of the resultant compound is blocked with hydrocarbon groups or acyl group. Nonene oxide, cyclohexene oxide and α-olefin oxides having 12 to 40 carbon atoms are preferably used as the olefin oxide.

Preferred examples of the water-insoluble polyoxyethylene type polyether are shown in Table 1.

TABLE 1

| Polyether No. | Active Hydrogen-Containing Compound Z | Polymerization Degrees of Ethylene Oxide (EO) l | Type of Olefin Oxide ($R^1O$) | Polymerization Degree of Olefin Oxide ($R^1O$) | Type of $R^2$ | Polyoxyethylene polyether polymer Average molecular weight | Ratio $\frac{m[M(R^1O)] + [M(R^2)]}{44l}$ |
|---|---|---|---|---|---|---|---|
| 1 | ethylene glycol (k = 2) | EO, l = 55 | α-olefin oxide having 20 to 30 (average: 23) carbon atoms | 3 | H | 6930 | 0.42 |
| 2 | ethylene glycol (k = 2) | EO, l = 55 | α-olefin oxide having 20 to 30 (average: 23) carbon atoms | 5 | H | 8282 | 0.70 |

TABLE 1-continued

| Polyether No. | Active Hydrogen-Containing Compound Z | Polymerization Degrees of Ethylene Oxide (EO) l | Type of Olefin Oxide ($R^1O$) | Polymerization Degree of Olefin Oxide ($R^1O$) | Type of $R^2$ | Polyoxyethylene polyether polymer Average molecular weight | Ratio $\frac{m[M(R^1O)] + [M(R^2)]}{441}$ |
|---|---|---|---|---|---|---|---|
| 3 | ethylene glycol (k = 2) | EO, l = 55 | α-olefin oxide having 12 to 14 (average: 13) carbon atoms | 10 | H | 8862 | 0.82 |
| 4 | ethylene glycol (k = 2) | EO, l = 55 | α-olefin oxide having 16 to 18 (average: 17) carbon atoms | 10 | H | 9982 | 1.05 |
| 5 | ethylene glycol (k = 2) | EO, l = 40 | α-olefin oxide having 20 to 30 (average: 23) carbon atoms | 5 | H | 6962 | 0.96 |
| 6 | ethylene glycol (k = 2) | EO, l = 90 | α-olefin oxide having 20 to 30 (average: 23) carbon atoms | 3 | H | 10010 | 0.26 |
| 7 | bisphenol A (k = 2) | EO, l = 80 | α-olefin oxide having 12 to 14 (average: 13) carbon atoms | 16 | H | 13604 | 0.90 |
| 8 | glycerol (k = 3) | EO, l = 40 | α-olefin oxide having 16 to 18 (average: 17) carbon atoms | 5 | H | 9182 | 0.72 |
| 9 | pentaerythritol (k = 4) | EO, l = 40 | α-olefin oxide having 12 to 14 (average: 13) carbon atoms | 5 | H | 11136 | 0.56 |
| 10 | sorbitol (k = 6) | EO, l = 30 | α-olefin oxide having 20 to 30 (average: 23) carbon atoms | 2 | H | 12158 | 0.51 |
| 11 | n-butanol (k = 1) | EO, l = 80 | nonene oxide | 30 | H | 7854 | 1.21 |
| 12 | phenol (k = 1) | EO, l = 100 | α-olefin oxide having 12 to 14 (average: 13) carbon atoms | 20 | H | 8454 | 0.90 |
| 13 | ethylene glycol (k = 2) | EO, l = 55 | Octadecylene oxide | 4 | H | 7046 | 0.44 |
| 14 | ethylene glycol (k = 2) | EO, l = 55 | α-olefin oxide having 20 to 30 (average: 23) carbon atoms | 3 | $CH_3$ | 6958 | 0.43 |

In the compounds indicated in Table 1, preferred examples of group $R^2$ other than the hydrogen atom (H), there can be mentioned —$CH_3$, —$C_6H_5$, —$CH_2C_6H_5$, —$C_{12}H_{25}$, —$C_{18}H_{37}$, —$C_{18}H_{35}$, $C_{11}H_{23}CO$—, $C_{17}H_{33}CO$— and $C_{17}H_{35}CO$—.

The above-mentioned water-insoluble polyoxyethylene type polyether can be used alone or in the form of a mixture of two or more thereof.

The water-insoluble polyoxyethylene type polyether polymer is incorporated in an amount of 0.2 to 30 parts by weight per 100 parts by weight of the aromatic polyester resin. If the incorporated amount of the water-insoluble polyoxyethylene type polyether is smaller than 0.2 part by weight, the hydrophilic property of the obtained shaped article is too low, and a satisfactory antistatic property, sweat-absorbing property and stain resistance thereof cannot be manifested. Even if the incorporated amount of the water-insoluble polyoxyethylene type polyether is increased to above 30 parts by weight, no further improvement in the antistatic property, sweat-absorbing property and stain resistance can be attained, but the mechanical properties, heat resistance and light resistance thereof become poor.

Where the composition of the present invention is melt-spun into a fiber, preferably the water-insoluble polyoxyethylene type polyether content in the fiber is 0.2 to 10% by weight. If the water-insoluble polyoxyethylene type polyether content is thus adjusted, yarn breakage at the spinning step or winding of individual filaments around roller due to breaking of individual filaments at the drawing step can be restricted. Most preferably, the water-insoluble polyoxyethylene type polyether content is 0.2 to 7.0% by weight, more preferably 0.2 to 3.0% by weight.

The polyester composition of the present invention can be added with an organic or inorganic ionic compound, preferably an organic ionic compound to improve the antistatic property thereof. As the organic ionic compound, organic sulfonic acid salts substantially non-reactive with the aromatic polyester resin are preferably employed. As the organic sulfonic acid salts, metal salts and quaternary phosphonium salts of sulfonic acids are preferably used.

The organic sulfonic acid salts are preferably selected from those of the formulae (II) to (V):

$$RSO_3M \qquad \text{(II)}$$

$$RSO_3PR^3R^4R^5R^6 \quad (III)$$

$$R^7O(R^8O)_n(CH_2)_pSO_3M \quad (IV)$$

and $$R^7O(R^8O)_n(CH_2)_pSO_3PR^3R^4R^5R^6 \quad (V)$$

are preferably employed.

In the formulae (II) to (V), R represents a member selected from the group consisting of alkyl groups having 3 to 30 carbon atoms and aryl groups having 7 to 40 carbon atoms; M represents at least one alkali metal, preferably from Na, K, or Li, and $R^3$, $R^4$, $R^5$ $R^6$ respectively and independently from each other represent a member selected from the group consisting of alkyl groups and aryl groups, preferably from lower alkyl groups, phenyl group and benzyl group, represents a $R^7$ represents a member selected from monovalent hydrocarbon groups, preferably alkyl, cycloalkyl, aryl and alkylaryl groups, and $R^8$ represents an alkylene group preferably having 2 to 4 carbon atoms, for example, ethylene, propylene or tetramethylene group.

The compound of the formulae (IV) or (V) includes copolymers containing ethylene group and propylene group as the $R^8$ group.

Most preferably, the $R^8$ group is ethylene group.

In the formulae (IV) and (V), preferably, n represents an integer of 1 to 100, more preferably 2 to 30, and p represents an integer of 2 to 4.

In the case where R in the formulae (II) and (III) represents an alkyl group, this alkyl group may be linear or may have a branched side chain.

The metal salts and quaternary phosphonium salts of sulfonic acid represented by the formulae (II) to (V) can be used individually or in the form of a mixture of two or more thereof. Preferable examples of the compound represented by the formula (II), include sodium stearylsulfonate, sodium octylsulfonate, sodium dodecylbenzenesulfonate, a mixture of sodium alkylsulfonates having 14 carbon atoms in average, sodium dodecylbenzenesulfonates (hard type and soft type), lithium dodecylbenzensulfonates (hard type and soft type) and magnesium dodecylbenzenesulfonates (hard type and soft type).

Also, preferred examples of the compound represented by tile formula (III) include tetrabutylphosphonium alkylsulfonates having 14 carbon atoms in average, tetraphenylphosphonium alkylsulfonates having 14 carbon atoms in average, butyltriphenylphosphonium alkylsulfonates having 14 carbon atoms in average, tetrabutylphosphonium dodecylbenzenesulfonates (hard type and soft type), tetraphenylphosphonium dodecylbenzenesulfonates (hard type and soft type) and benzyltriphenylphosphonium dodecylbenzenesulfonates (hard type and soft type).

Further, preferred examples of the compound of the formula (IV) are those of the following formulae.

$C_8H_{17}O(CH_2CH_2O)_7CH_2CH_2CH_2SO_3Na$,
$CH_3O(CH_2CH_2O)_9CH_2CH_2CH_2SO_3Na$,
$CH_3O(CH_2CH_2O)_{23}CH_2CH_2CH_2SO_3Na$,
$C_{16}H_{33}O(CH_2CH_2O)_{23}CH_2CH_2CH_2SO_3Na$,
$C_{18}H_{37}O(CH_2CH_2O)_{23}CH_2CH_2CH_2SO_3Na$,
$C_{16}H_{33}O(CH_2CH_2O)_{30}CH_2CH_2CH_2SO_3Na$,
$C_{12}H_{25}O(CH_2CH_2O)_{10}CH_2CH_2CH_2SO_3Na$,
$CH_3O(CH_2CH_2O)_9CH_2CH_2CH_2CH_2SO_3Na$,
$C_{12}H_{25}O(CH_2CH_2O)_{10}CH_2CH_2SO_3Na$,
$C_{12}H_{25}O(CH_2CH_2O)_{22}CH_2CH_2SO_3Na$,

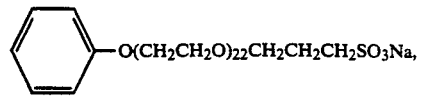

$C_{16}H_{33}O(CH_2CH_2O)_9CH_2CH_2SO_3K$,
$C_{18}H_{37}O(CH_2CH_2O)_{15}CH_2CH_2SO_3Na$,
and Li-salt compound corresponding to tho above-mentioned Na-salt compounds.

Furthermore, preferred examples of the compound of the formula (V) are tetra-n-butyphosphonium salt compounds, tetraphenylphosphonium salt compounds, n-butyl-triphenylphosphonium salt compounds and phenyl-tri-n-butylphosphonium salt compounds corresponding to the above-exemplified Na-or Li-salt compounds of the formula (IV).

The above-mentioned organic sulfonic acid salt compound of the formulae (ZZ) to (V) can be used individually or in the form of a mixture of two or more thereof.

Among the above-mentioned organic sulfonic acid salt compounds of the formulae (II) to (V), most preferable compounds are:

(1) Compounds which form a transparent composition when melt-blended with the polyester resin and rapidly cooled, and (2) Compounds which are substantially compatible with the water-insoluble polyoxyethylene polyether polymer and impart an excellent antistatic property and durability therein to the resultant polyester composition.

The above-mentioned specific compounds (1) include the compounds of the formula (II) in which R represents an alkylphenyl group having 10 to 40 carbon atoms and M represents a Li atom, the compounds of the formula (II) in which R represents an alkyl naphthyl group having 14 to 40 carbon atoms, and the compounds of the formula (III).

Also, the above-mentioned specific compounds (2) include the compounds of the formulae (IV) and (V).

Among the above-mentioned organic sulfonic acid salt compounds, the specific compounds of the formula (II) in which R represents an alkylphenyl group having 10 to 40 carbon atoms and M represents an Li atom, and the specific compounds of the formula (II) in which R represents an alkylnaphthyl group with 14 to 40 carbon atoms, are very effectively employed to produce a polyester composition having not only an excellent antistatic property and durability therein but also a superior dyeability evaluated by naked eye observation and a high resistance to fibrilization after applying an alkali weight-reduction treatment, and an alkali weight reduction rate similar to that of conventional non-modified polyester.

Particularly, the specific compounds of the formula (II) in which R represents an alkylnaphthyl group with 14 to 40 carbon atoms are the most practical preferable compounds for producing a polyester composition having an excellent heat-resistance.

The most preferable organic sulfonic acid salt compounds are lithium t-butylbenzenesulfonate, lithium dibutylbenzenesulfonate, lithium octylbenzenesulfonate, lithium dodecylbenzene sulfonate (hard type and soft type), lithium didodecylbenzenesulfonate, lithium dioctylbenzenesulfonate, sodium butylnaphthalenesulfonate, potassium dibutylnaphthalenesulfonate, sodium dibutylnaphthalenesulfonate; lithium dibutylnaphthalenesulfonate, sodium octylnaphtlalenesulfonate, sodium dioctylnaphthalenesulfonate, sodium dodecylnaphthalenesulfonate, and sodium didodecylnaphthalenesulfonate.

Preferred examples of the inorganic ionic compound include potassium iodide, sodium chloride, calcium chloride, sodium thiocyanate, potassium thiocyanate, lithium thiocyanate and cesium thiocyanate.

The organic and inorganic ionic compounds can be employed individually or in the form of a mixture of two or more thereof.

Preferably, the organic or inorganic ionic compound is incorporated in an amount of 0.05 to 10 parts by weight to 100 parts by weight of the aromatic polyester resin. If the amount of the organic or inorganic ionic compound is smaller than 0.05 part by weight, the effect of improving the antistatic property of the resultant composition is poor, and if tile amount of the organic or inorganic ionic compound exceeds 10 parts by weight, the mechanical properties of the resultant composition are degraded.

In the composition of tile present invention, the amount of the antimony compound contained as the polycondensation catalyst residue in the aromatic polyester resin is preferably adjusted to 30 ppm or less in terms of antimony atom. If tile residual amount of the antimony compound is thus limited, thermal decomposition of the water-insoluble polyoxyethylene type polyether due to a high temperature, a low extrusion rate and a long residence time at the step of melt-shaping the composition can be restricted, and reduction in the water insolubilization and the alkali durability of the water-insoluble polyoxyethylene type polyether can be prevented.

In general, an antimony compound such as antimony trioxide is widely used as the polycondensation catalyst in the process of the synthesis of an aromatic polyester. The amount of the antimony compound to be used is generally 200 to 600 ppm in terms of antimony atom, based on the weight of the aromatic polyester resin. The antimony compound added in such an amount promotes the thermal decomposition of the water-insoluble polyoxyethylene type polyether. To substantially prevent the thermal decomposition of the water-insoluble polyoxyethylene type polyether, preferably the content of the antimony compound in terms of antimony atom is 30 ppm or less, especially 10 ppm or less. The antimony compound referred to herein includes all of organic and inorganic compounds containing antimony. In general, antimony oxides such as antimony trioxide, antimony tetraoxide and antimony pentaoxide are used. The degree of action of promoting the thermal decomposition of the water-insoluble polyoxyethylene type polyether by the antimony oxide is larger than that of other antimony compound such as antimony acetate, and thus the antimony oxide is especially critical.

The aromatic polyester resin having the antimony compound content controlled to 30 ppm or less can be synthesized by using a known polycondensation catalyst other than the antimony compound as the main component of the polycondensation catalyst for the synthesis of an aromatic polyester. A titanium compound and a germanium compound are especially preferable as this polycondensation catalyst. As preferred examples of the titanium compound, there can be mentioned titanium alkoxides such as titanium isopropoxide, titanium propoxide and titanium butoxide, aliphatic carboxylic acid salts of titanium such as titanium oxalate and titanium acetate, reaction products obtained by reacting titanium alkoxides with aromatic polyvalent carboxylic acids such as phthalic acid, trimellitic acid, hemimellitic acid and pyromellitic acid or anhydrides thereof, and reaction products obtained by reacting organic acid salts of titanium such as titanium oxalate with alkali metals or alkaline earth metals. As preferred examples of the germanium compound, there can be mentioned oxides of germanium such as germanium oxide; alkoxides of germanium such as germanium butoxide; germanium glycolate, germanium chloride, germanium acetate, germanium hydroxide and sodium and potassium salts of the above-mentioned germanium compounds.

Preferably, the composition of the present invention further comprises 0.02 to 3 parts by weight of a phosphite type antioxidant per 100 parts by weight of the aromatic polyester.

The phosphite type antioxidant contained in the composition of the present invention restricts the thermal decomposition of the water-insoluble polyoxyethylene type polyether due to a high temperature, a low extrusion rate and a long residence time at the melt-shaping step of the composition of the present invention, and the reduction in the water insolubilization and the alkali durability of the water-insoluble polyoxyethylene type polyether can be prevented.

The phosphite type antioxidants useable for the present invention are not limited to a specific type thereof as long as they exhibit an antioxidant property.

A preferred phosphite type antioxidant usable for the present invention comprises at least one member, selected from triphenyl phosphite, tris(2,4-di-t-butylphenyl) phosphite, tris(mononoylphenyl) phosphite, tris(-dinonylphenyl) phosphite, tris(mono- and dinonylphenyl) phosphite, diphenylmonooctyl phosphite, diphenylmonodecyl phosphite, didecylmonophenyl phosphite, trisdecyl phosphite, trisisodecyl phosphite, bis[-dialkyl($C_{12}$-$C_{15}$)]-bisphenol A diphosphite, distearylpentaerythritol diphosphite, di(mononoylphenyl)pentaerythritol diphosphite, di(dridecylphenyl)pentaerythritol diphosphite, bis(2,6-di-t-butyl-4-methylphenyl)-pentaerythritol diphosphite, 4,4'-butylidene-bis(3-methyl-6-t-butylphenyl-ditridecyl phosphite), 2,4,4'-butylidene-tris(3-methyl-6-t-butylphenylditridecyl phosphite), tetrakis(2,4-di-t-butylphenyl)-4,4'-biphenylene phosphonite, 2,2-methylene-bis(4,6-di-tert-butylphenyl) octylphosphite and 2,2-methylene-bis(4,6-di-tert-butylphenyl)-2,4-di-tert-butylphenylphosphite.

The amount of the phosphite type antioxidant to be added is preferably 0.02 to 3 parts by weight per 100 parts by weight of the aromatic polyester resin. If the amount of the antioxidant is smaller than 0.02 part by weight, the effect of inhibiting the thermal decomposition of the water-insoluble polyoxyethylene type polyether is insufficient, and even if the amount of the antioxidant exceeds 3 parts by weight, the effect of inhibiting the thermal decomposition is saturated and no further improvement can be attained, but the mechanical properties and hue of the obtained shaped article become poor.

For the production of the composition of the present invention, the water-insoluble polyoxyethylene type polyether and, if necessary, the phosphite type antioxidant and at least one member selected from the organic and inorganic ionic compounds are incorporated into the aromatic polyester resin simultaneously or in an optional order by a conventional blending method.

Namely, the resin and the respective additive components are separately melted and the resultant melts are mixed with each other at one operation or dividedly in at least two times at an optional stage before completion of the shaping of the aromatic polyester resin, for example, a stage of before or during the polycondensation step of the aromatic polyester, a stage after the polycondensation reaction is completed and the resin is still in the state of a melt, a stage where the resin is in the particulate form, or a stage of shaping operation. Alternatively, the respective additive components are separately incorporated into the aromatic polyester resin, and the resultant mixtures are blended before the shaping operation. When the additive components are added before the middle stage of the polycondensation reaction, they may be added in the state dissolved or dispersed in a solvent such as glycol.

A conventional antioxidant and a conventional ultraviolet absorber can be incorporated into the composition of the present invention, and the incorporation of these additives is preferred. Furthermore, a flame retardant, a fluorescent whitening agent, a delustering agent, a colorant and other additives can be added according to need.

When fibers are prepared from the polyester composition of the present invention, optional yarn-forming conditions can be adopted without any limitation. For example, optional yarn-forming conditions can be adopted in the method where a melting spinning operation is carried out at a speed of 500 to 2500 m/min and the drawing and heat treatment are conducted, another method in which a melt spinning operation is carried out at a speed of 1500 to 5000 m/min and the drawing and false-twisting treatment are conducted simultaneously or in sequence, and still another method in which a melt spinning operation is carried out at a high speed exceeding 5000 m/min and the drawing step is omitted according to the intended use. Preferably, the resultant fibers or woven or knitted fabric prepared from the fibers are heat-treated at a temperature of 100° C. or more. By this heat treatment, the stabilization of the structure of the fibers or fabric and the migration of the water-insoluble polyoxyethylene type polyether and optional additives incorporated thereinto contained in the composition to the vicinity of the surface is promoted. Furthermore, a relaxation heat treatment can be applied thereto if necessary.

The composition of tile present invention also can be used for the production of a film and a sheet. In this shaping process, optional shaping conditions can be adopted without any limitation. For example, optional conditions can be adopted in the method in which a tension is applied to a formed film only in one direction to obtain an anisotropic film, the method in which a formed film is biaxially drawn simultaneously or in sequence, and the method in which a formed film is drawn in two or more steps. For the above-mentioned reasons, preferably the resultant film or sheet is heat-treated at a temperature of 100° C or more.

Furthermore, the composition of the present invention can be used in the form of a master batch. This master batch is diluted with an ordinary polyester resin not containing the water-insoluble polyoxyethylene type polyether, and the resultant mixture is melt-shaped into a final shaped article such as a fiber, a film, a sheet or the like.

The composition of tile present invention is useful for the industrial production of hydrophilic aromatic polyester composition shaped article, for example, fibers, having a high resistance in the hydrophilic property to an alkali treatment which causes a large weight reduction, to a hot water treatment at a high temperature and to repeated severe laundry treatments, and an excellent antistatic property, sweat-absorbing property and soil-releasing property.

When a shaped article, for example, fibers, prepared from the polyester composition of the present invention are subjected to a laundry treatment and a heat treatment such as an ironing or pressing treatment repeatedly, the excellent antistatic property, sweat-absorbing property and soil-releasing property thereof can be retained without loss. Accordingly, the composition of the present invention is a material very suitable for the production of a shaped article which is frequently subjected to a heat treatment and for which a high antistatic property, sweat-absorbing property and soil-releasing property are required.

Recently, uniforms used in various workshops, working clothes used in factories and the like, white robes used in medical institutions and food industries, other clothes, sheets, bed covers, bathrobes, nightclothes and other bedclothes used in hospitals and hotels, and tableclothes and table covers used in restaurants, banquet halls and assembly halls are called "linens" and they are often rented to users, and the ratio of linens to be rented to the-total demand of linens is increasing year by year. This field is called a linen supply field and these articles are required to have the following properties. Namely, the articles are required by the users to be clean and to be comfortably used or worn. From the suppliers, the articles should allow stains of the article to be easily removed, recontamination of the article with the stains during laundry is prevented, and the properties of the articles are not degraded and a good comfort is maintained even if laundering, ironing and pressing operations are repeatedly applied. The content of the comfortableness differs according to the place where the articles are actually used, but the comfort is typically represented by the absorption of sweat during wearing (sweat-absorbing property) and the prevention of generation of static charges (antistatic property). Accordingly, articles to be used in the linen supply field are required to have properties such that stains can be easily removed, stains do not adhere to the articles again during washing, that is, the articles have a soil-releasing property, the articles have sweat-absorbing property and antistatic property in combination, and the initial characteristics can be retained even if laundering is repeated and a heat treatment such as ironing or pressing is repeated after laundering. Since the article shaped from the composition of the present invention has excellent soil-releasing property, sweat-absorbing property and antistatic property and has an excellent laundering resistance and heat resistance, this shaped article can be suitably used in the above-mentioned application field.

Generally, polyester fibers are subjected to an alkali weight-reducing treatment for improving the touch thereof. The fibers prepared from the polyester composition of the present invention are characterized in that an excellent antistatic property, sweat-absorbing property and soil-releasing property are not influenced by the alkali weight-reducing treatment and the mechanical properties of the fibrous article are hardly degraded by the alkali weight-reducing treatment. Accordingly, the touch of the article prepared by using the fibers of the present invention can be improved by the alkali weight-reducing treatment. Accordingly, the polyester fiber article of the present invention can be used not only in the field of fabrics such as inner fabrics for ladies, for example, lingerie, lining fabrics and dust-free fabrics, but also as front fabrics to be used in the field where a high antistatic property, sweat-absorbing property and soil-releasing property are required. Therefore, the polyester fiber article of the present invention is a very useful material.

The reason why an excellent durable hydrophilic property is manifested in a shaped article, especially fibers, obtained from the polyester composition of the present invention has not been sufficiently elucidated, but, it is considered that a number of fine pores having a capillary condensing capacity are formed in the fibers by the weight-reducing treatment with the alkali and amine aqueous solutions and the water-insoluble polyoxyethylene type polyether is predominantly distributed in the inside surface portions around the fine pores of the fibers. Accordingly, the polyester fibers of the present invention have an excellent durable moisture-absorbing property, and usual characteristic properties of polyester fibers, such as rapid-drying property and easy-care property are retained, and thus the polyester fibers of the present invention have an excellent moisture release property. Therefore, water in the gaseous state is smoothly transferred from the interior of the cloth to the outside through the moisture absorption-moisture release mechanism, and the humidity within the cloth is maintained at a low level and a very good wearing comfort can be obtained.

The fibers of the present invention can be either regular fibers having no hollow core or hollow fibers having one or more hollow cores. The cross-sectional profile of the fibers or the shape of the hollow core may be circular or non-circular. To promote the moisture-absorbing speed, preferably the cross-sections of the fibers have a non-circular profile having a cross-sectional deformation ratio of at least 5000/d. The cross-sectional deformation ratio (cm$^{-1}$) refers to a value obtained by dividing the length (cm) of the contour line on the cross-sectional profile of each fiber by the cross-sectional area (cm$^2$) of the fiber, and d represents the denier of the individual fiber. In case of the hollow fiber, the length of the contour line in the cross-sectional profile of the fiber is the sum of the length of the outside peripheral contour line and the length of the inside peripheral contour line of the hollow core.

Furthermore, the fiber of the present invention can be a core-in-sheath type conjugate fiber comprising a sheath composed of a composition comprising as the main components, the above-mentioned water-insoluble polyoxyethylene type polyether and aromatic polyester resin and a core composed of a polyester resin not containing the above-mentioned water-insoluble polyoxyethylene type polyether, or a core-in-sheath type conjugate fiber comprising a core composed of the above-mentioned polyester resin composition and a sheath composed of a polyester not containing the above-mentioned water-insoluble polyoxyethylene type polyether. Moreover, the fiber of the present invention can be a side-by-side type multilayer conjugate fiber comprising at least two layers including a layer composed of the above-mentioned composition and a layer composed of a polyester resin not containing the water-insoluble polyoxyethylene type polyether.

To impart a moisture-absorbing activity to the above-mentioned polyester fibers, after the drawing heat treatment or false-twisting processing is applied to the fibers according to need, or after the fibers are converted to a fabric, the fibers or fabric is subjected to a weight-reducing treatment with an aqueous solution containing an alkali or amine. The term alkali refers to a substance capable of hydrolyzing and dissolving the polyester fibers, such as sodium hydroxide, potassium hydroxide, tetramethylammonium hydroxide, sodium carbonate or potassium carbonate. Use of sodium hydroxide and potassium hydroxide as the alkali is especially preferred. An agent for promoting the alkali weight reduction, such as cetyltrimethylammonium bromide or lauryldimethylbenzylanmonium chloride can be added to the aqueous solution of the alkali. The alkali weight-reducing treatment can be easily accomplished by dipping the article to be treated in the aqueous solution of the alkali or by impregnating the article to be treated with the aqueous solution of the alkali and subjecting the impregnated article to a steam heat treatment. The concentration of the aqueous solution of the alkali depends on the type of the alkali and the treatment conditions, but preferably the concentration of the alkali is 0.01 to 40% by weight, especially 0.1 to 30% by weight. Preferably, the alkali weight-reducing treatment is carried out at a temperature of from room temperature to 160° C.

Any amine compounds having a property of decomposing polyester fibers can be used as a reactant for the weight-reducing treatment. As typical instances of the amine compound, there can be mentioned alkylamines such as monomethylamine, monoethylamine, n-propylamine, n-butylamine, i-butylamine, ethylene-diamine and monoethanolamine, aromatic amines such as aniline, and hydrazines such as hydrazine hydrate. Preferably, the amine compound is used in the form of an aqueous solution or aqueous dispersion, and the concentration thereof is appropriately set according to the composition of the polyester fibers to be treated. In general, the weight-reducing treatment temperature is preferably 10° to 50° C. Since the boiling point of the amine compound is low, when a treating solution containing the amine compound is used, preferably, the treatment temperature is not so high and is generally in the range of from 20° C. to 40° C. If the treatment temperature is too high, the decomposing rate of the polyester fibers is excessively high and the reproducibility of the treatment effect is often lowered.

The weight reduction ratio of the polyester fibers by the alkali or amine treatment is appropriately determined so that the desired degree of moisture absorption can be obtained, but preferably, the total weight reduction ratio is adjusted to at least 2% by weight based on the weight of the starting fiber.

The polyester fibers of the present invention can be subjected to both of the alkali treatment and the amine treatment. In this case, it is preferable that the amine treatment be first conducted and the alkali treatment be then carried out. The reason is that in general, at the amine treatment, the amine compound diffuses and penetrates into the surface and interior portions of the fibers and the decomposition by the amine is substantially uniformly advanced even into the interior portions of the fibers, but at the alkali treatment, the decomposition by the alkali is sequentially advanced from the surfaces toward the interior portion of the fibers. Accordingly, if certain voids are formed in the surface and interior portions of the fibers by the amine treatment to increase the surface area and the alkali treatment is then applied, the weight-reducing efficiency by the alkali treatment is drastically improved and the effect of increasing the moisture absorption becomes more conspicuous.

After the weight-reducing treatment, the polyester fibers of the present invention preferably have a moisture absorption of at least 3% by weight at a temperature of 20° C. and at a relative humidity of 92%. Thus, a polyester fiber material having a good comfort to wear, which is intended in the present invention, can be obtained. If the above-mentioned moisture absorption is lower than 3% by weight, an article of clothing which is very comfortable when worn cannot be obtained from the polyester fibers.

In the preparation of a polyester fibers from the composition of the present invention, a particular spinning operation adopted in the preparation of a conventional conjugate fiber (an antistatic agent is predominantly distributed at a high concentration in the core of a core-in-sheath type conjugate fibers to render the alkali treatment possible) or a conventional hollow fibers (an antistatic agent is predominately distributed in the vicinity of the hollow cores of a polyester hollow fibers to render the alkali treatment possible), need not be adopted. Namely, the polyester fibers of the present invention can be prepared according to a customary spinning process and is especially advantageous in that the cost is relatively low, diversification is possible (it is easy to obtain fibers having a non-circular cross sectional profile or small-denier fibers), and the color of a dyed product has an excellent depth and vividity.

Note, the foregoing description does not exclude the use of the composition of the present invention as a core and/or a sheath component in a core-in-sheath type conjugate fibers and the formation of a hollow fibers from the composition of the present invention. Namely, the composition of the present invention can be shaped into a core-in-sheath type conjugate fibers or hollow fibers according to need. In view of the antistatic property or its durability, the hollow fibers are preferable and are useful in some applications.

The polyester fibers of the present invention are practically satisfactory in yarn properties thereof such as the strength and fibrillation resistance, and have an enhanced antipilling property.

The polyester fibers of the present invention can be subjected to a post treatment to make the fibers hydrophilic. For this hydrophilic property-imparting post treatment, there can be adopted a method in which the polyester fibers are treated with an aqueous dispersion of a polyester-polyether block copolymer comprising terephthalic acid and/or isophthalic acid or a lower alkyl ester thereof and a polyalkylene glycol, and a method in which a hydrophilic monomer such as acrylic acid or methacrylic acid is grafted to the polyester fibers and then the grafted acid is converted to a sodium salt thereof.

EXAMPLES

The present invention will be further described in detail with reference to the following examples. In the examples, all of "parts" and "%" are by weight. The antistatic property, water-absorbing property, soil-releasing property, resistance to frictional electrification, dyeing property, fibrilization resistance, diluted solution viscosity and moisture absorption of the resultant fibers were determined according to the following methods.

(1) Antistatic Property

A sample was allowed to stand in an atmosphere maintained at a temperature of 20° C. at a relative humidity of 65% for 24 hours or more, and the sample was set on a static honest meter. A voltage of 10 kV was applied to electrodes of the meter and the half value period (seconds) of the charge voltage of the sample was measured at a temperature of 20° C. at a relative humidity of 65%.

(2) Water-Absorbing Rate (according to JIS L-1018)

A sample fabric was spread horizontally and one drop (0.04 cc) of water was dropped onto the sample from a height of 1 cm, and the time (seconds) required for complete absorption of water in the sample and disappearance of reflected light was measured.

(3) Soil-Releasing Property (i) Staining Treatment

A pot of a Colorpet Dyeing Tester (supplied by Nippon Senshokuki) was charged with 300 ml of a staining liquid having a composition described below, and a sample of 10 cm×13 cm inserted in a holder of the meter was dipped in the staining liquid and a stirring treatment was carried out at 50° C. for 100 minutes.

| Composition of Staining Liquid | |
|---|---|
| Artificial stain liquid (described below) | 1% by weight |
| Sodium alkylbenzene-sulfonate | 0.02% by weight |
| Sodium sulfate | 0.03% by weight |
| Sodium tripolyphosphate | 0.02% by weight |

The composition of the artificial stain liquid was as described below.

| Artificial Stain Liquid | |
|---|---|
| Motor oil (Dia Queen Motor Oil M-2 supplied by Mitsubishi Jidosha Kogyo) | 99.335% by weight |
| Fuel oil B | 0.634% by weight |
| Carbon black | 0.031% by weight |

After the above-mentioned treatment, the sample was lightly washed in water, and interposed between filter paper pieces to remove excess staining liquid. Each of these staining, water washing and excess stain liquid-removing treatments was repeated four times. A half of the stained sample was washed under weak washing conditions for 10 minutes in warm water maintained at 40° C. which contained 2 g/l of Marseille soap, by using a household laundry machine. Then, the staining property and soil-releasing property were determined according to the following methods.

(ii) Evaluation of Staining Property and Soil-Releasing Property

By using a spectrophotometer (Macbeth MS-2020 supplied by Instrumental Color System Limited), the E* value of the sample in a colorimetric system CIE was determined according to customary procedures, and the degrees of the staining property and soil-releasing property were calculated according to the equations: $\Delta E^*_A = E^*_1 - E^*_2$ and $\Delta E^*_B = E^*_1 - E^*_3$, in which $\Delta E^*_A$ represents the degree of staining, $\Delta E^*_B$ represents the degree of soil-releasing; $E^*_1$ represents E* of the sample before the staining treatment, $E^*_2$ represents E* of the sample after the staining treatment and $E^*_3$ represents E* of the sample after the laundering treatment.

(4) Frictional Electrification Resistance (i) Tester and Friction Material Tester:
Rotary static tester with an oscilloscope
Friction cloth:
Cotton broad cloth (30s) scoured, bleached, non-starch finished.

(ii) Preparation of test pieces
Dimension of test piece
For winding-test:
Width: 3.8 cm, length: 30 cm
For frame test:
Width: 4.0 cm, length: 8.0 cm
Three test pieces were prepared for each test.

From the cotton broad cloth, three friction cloth pieces having a width of 2.5 cm and a length of 14.0 cm were prepared in the warp direction of the broad cloth.

(iii) Test operation (a) Conditioning: The test pieces were placed in a dessicator at room temperature and at a relative humidity (RH) of 40±2%, for 24 hours or more.

(b) Atmosphere of testing room
Temperature: 20°±2° C.
RH 40±2%

(c) Test piece: single (d) Rotation speed of friction drum: 700 r.p.m (e) Electrification equilibrium time: one minute (f) Contact pressing load: 600 g (g) Operation A test piece was fixed on the periphery of a rotation drum of the rotary static tester in such a manner that the front surface of the test piece faced outward, a friction cloth was fixed by two chips located at the lower portion of the tester so that the friction cloth was in parallel to and came into contact with the test piece. A pressing load of 600 g was applied to the friction cloth, and the recorder (5 cm/min), the rotation drum and the oscilloscope were driven successively. When the electrification of the test piece reached equilibrium, the friction electrification voltage (v) and polar value (±, −) were measured. The electrification voltage was represented by an average value (to ten integral figures) of the measured values of three test pieces.

When the friction electrification voltage of the test piece is 1500 V or less, the antistatic property of test piece is satisfactory.

(5) Dyeing Property

A dyed material was subjected to a measurement of L* value (lightness index) by a colorimeter (available under the trademark of Macbeth MS-2020, from Instrumental Color System Ltd.).

The smaller the L* value, the higher the luminous color depth, and thus the higher the dyeing property evaluated by naked eye observation.

(6) Fibrilization resistance

A front surface of a test piece was rubbed predetermined times with a friction cloth consisting of a 100% polyethylene terephthalate filament georgette crape under a load of 500 g by using a Gakushin-type surface friction tester.

The color change in the rubbed surface of the test piece was evaluated by using a grey scale for a color fastness test.

The test results were indicated by classes 1 to 5 (Class 5 best and class 1 was worst). Usually, class 2 and class 4 are satisfactory.

(7) Laundry treatment

To evaluate the durability of the antistatic property (1), water-absorbing rate (2), soil-releasing property (3) and frictional electrification resistance (4) of the sample against laundry treatment, the sample was subjected to the following laundering treatment.

A household laundry machine (National NA-680L) was charged with 30 l of a solution containing 2 g/l of a washing enzyme-containing detergent (Shin Koso Zabu supplied by Kao) (bath ratio=1:30), and the sample was put into the solution and washed at 40° C. for 10 minutes by an automatic swirling water stream. Then, the sample was dehydrated, washed with 30 l of warm water maintained at 40° C. for 5 minutes (liquor ratio: 1:30), dehydrated, subjected to water overflow washing for 10 minutes and dehydrated. The combination of these operations was designated as one cycle of the laundry treatment. The laundering treatment was repeated by required cycles.

(8) Diluted solution viscosity

The diluted solution viscosity of the water-insoluble polyoxyethylene polyether polymer was measured at an concentration of 0.25 g/100 g in toluene in accordance with ASTM D 2857 at a temperature of 25° C. by using a capillary viscometer.

(9) Moisture absorption

A moisture absorption (Ab) of a specimen was determined in accordance with the following equation:

$$Ab\,(\%) = \frac{\overline{Wm} - \overline{Wd}}{\overline{Wd}} \times 100$$

wherein Wm represents a weight of the specimen at a predetermined temperature and at a predetermined relative humidity, and Wd represents a weight of the specimen when absolutely dry.

EXAMPLES 1 THROUGH 5 AND COMPARATIVE EXAMPLE 1

An ester exchange reaction vessel was charged with 100 parts of dimethyl terephthalate, 60 parts of ethylene glycol, 0.06 part (0.066 mole % based on dimethyl terephthalate) of calcium acetate monohydrate and 0.009 part (0.007 mole % based on dimethyl terephthalate) of cobalt acetate tetrahydrate as the color-adjusting agent, and the resultant reaction mixture was subjected to an ester exchange reaction by elevating the temperature of the reaction mixture from 140° C. to 220° C. over a period of 4 hours in a nitrogen atmosphere while methanol formed in the reaction vessel was removed to the outside of the vessel by distillation. After termination of the ester exchange reaction, 0.058 part (0.080 mole % based on dimethyl terephthalate) of trimethyl phosphate as a stabilizer and 0.024 part of dimethylpolysiloxane as a defoaming agent were added to the reaction mixture. Next, 10 minutes after, 0.04 part (0.027 mole % based on dimethyl terephthalate) of antimony trioxide was added to the reaction mixture, and the temperature was elevated to 240° C. simultaneously while excessive ethylene glycol was removed by distillation. Then, the reaction mixture was transferred into a polymerization reaction vessel, and a water-insoluble polyoxyethylene polyether polymer represented by the formula:

$$HO\!\!-\!\!(CHCH_2O)_m\!\!-\!\!(CH_2CH_2O)_l\!\!-\!\!(CH_2CHO)_m\!\!-\!\!H$$
$$\quad\quad\,|\qquad\qquad\qquad\qquad\qquad\qquad\,|$$
$$\quad\,C_jH_{2j+1}\qquad\qquad\qquad\qquad\quad C_jH_{2j+1}$$

wherein j is an integer of 14 to 16 (average: 15), l is about 180 in average and m is about 10 in average, and having a number average molecular weight of 13018, a diluted solution viscosity of 0.21, and a ratio {m[M(R¹O)]+[M(R²)]}/44 l of 0.65, was added in the amount shown in Table 2 to the reaction mixture. The pressure in the reaction vessel was reduced from 760 mmHg to 1 mmHg over a period of 1 hour, and simultaneously, the temperature of the reaction mixture was elevated from 240° C. to 280° C. over a period of 1 hour and 30 minutes. The polymerization was further conducted for 2 hours at a polymerization temperature of 280° C. under a reduced pressure of 1 mmHg or less, and at this stage, 0.4 part of Irganox 1010 (supplied by Ciba-Geigy) was added as the antioxidant to the reaction mixture under vacuum. Then, the polymerization was further continued for 30 minutes. The resultant polymer had an intrinsic viscosity in the range of from 0.645 to 0.655, and a softening point in the range of from 260° to 263° C. The polymer was formed into chips according to a customary procedures.

The resultant chips were dried according to a customary procedure and melt-spun at a temperature of 285° C. by using an extruding spinning machine having a spinneret having 24 circular spinning holes having a diameter of 0.3 mm. The resultant undrawn filament yarn was supplied to a drawing and heat-treating machine having a heating roller maintained at 80° C. and a plate heater maintained at 160° C. and was subjected to a drawing and heat treatment at a draw ratio that causing the resultant drawn filament yarn to exhibit an ultimate elongation of 30%, whereby a drawn filament yarn having a yarn count of 75 deniers/24 filaments was obtained.

A hosiery knitted fabric was prepared by using the resultant drawn filament yarn, and the fabric was scoured and preset at 180° C. for 45 seconds to obtain a knitted fabric A by customary procedures. After the above-mentioned presetting treatment, the knitted fabric was treated at a boiling temperature in an aqueous solution containing 3.5% of sodium hydroxide to obtain a knitted fabric B having a weight reduction of 20%.

The knitted fabrics A and B were subjected to a hot water treatment at 130° C. for 60 minutes in pure water (model of the dyeing treatment), and according to customary procedures, a final setting treatment was applied thereto at 160° C. for 45 seconds.

With respect to the resultant knitted fabrics A and B, the antistatic property [half value period (seconds) of the charge voltage] the water-absorbing speed (seconds) and the soil-releasing property were determined after 0 cycle ($L_0$) of laundry treatment and 25 cycles ($L_{25}$) of laundry treatment. The results are shown in Table 2.

EXAMPLES 6 AND 7

The same procedures as in Example 3 were repeated except that sodium alkylsulfonate having 8 to 20 carbon atoms and the average carbon atom number of 14 was added in an amount shown in Table 2 under vacuum together with the water-insoluble polyoxyethylene type polyether at the stage of 10 minutes after the stage at which the degree of vacuum reached 3 mmHg in the process of the reduction of the pressure for the polymerization reaction. The results are shown in Table 2.

EXAMPLES 8 AND 9

The same procedures as in Examples 6 and 7 were repeated except that tetrabutylphosphonium dodecylbenzene-sulfonate was used instead of the sodium alkylsulfonate. The results are shown in Table 2.

COMPARATIVE EXAMPLE 2

The same procedures as in Example 7 were repeated except that a water-soluble polyoxyethylene glycol having an average molecular weight of 20,000 was used instead of the water-insoluble polyoxyethylene type polyether. The results are shown in Table 2.

EXAMPLE 10

The sample procedures as in Example 6 were repeated except that a water-insoluble polyoxyethylene type polyether represented by the formula:

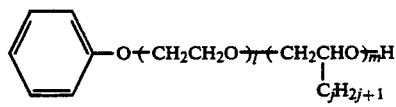

wherein j is an integer of from 10 to 12 (average: 11), l is about 100 in average and m is about 20 in average, and having a number average molecular weight of 8454, a diluted solution viscosity of 0.15, and a ratio {m[M(R¹O)]+M(R²)]}/44 l of 0.90, was used instead of the water-insoluble polyoxyethylene type polyether. The results are in Table 2.

COMPARATIVE EXAMPLE 3

The same procedures as in Example 6 were carried out except that a polyoxyethylene polyether polymer of the formula:

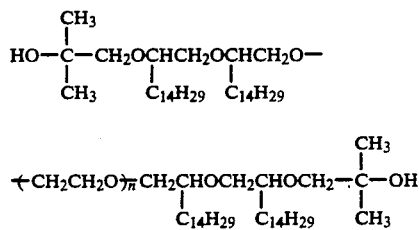

wherein n represents 115 in average, and having a number average molecular weight of 6182, a diluted solution viscosity of 0.12 and a ratio {m[M(R¹O)]+[M(R²)]}/44 l of 0.22 was employed. The test results are indicated in Table 2.

EXAMPLE 11

The same procedures as Example 6 were repeated except that a water-insoluble polyoxyethylene type polyether represented by the formula:

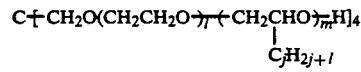

wherein j is an integer of from 10 to 12 (average: 11), l is about 40 in average and m is about 5 in average, and having a number average molecular weight of 11136, a diluted solution viscosity of 0.18 and a ratio {m[M(R¹O)]+[M(R²)]}/44 l of 0.56, was used instead of the water-insoluble polyoxyethylene type polyether. The results are shown in Table 2.

COMPARATIVE EXAMPLE 4

The same procedures as in Example 6 were conducted except that a water-insoluble polyoxyethylene polyether polymer of the formula:

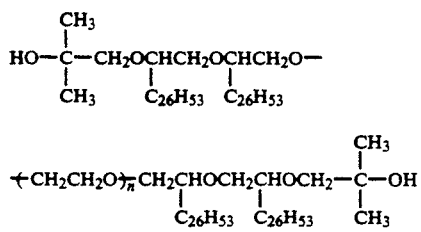

in which n represents 70 in average, and having a number average molecular weight of 4874, a diluted solution viscosity of 0.10 and a ratio $\{m[M(R^1O)]+[M(R^2)]\}/441$ of 0.59 was used. The test results are indicated in Table 2.

EXAMPLE 12

In a Nauta mixer (supplied by Hosokawa Micron), 1 part of the modified polyester chip prepared according to the same method as described in Example 5, and containing 30% by weight of the polyether, was mixed with 9 parts of an ordinary unmodified polyethylene terephthalate chip having an intrinsic viscosity of 0.710 for 5 minutes in a mixer. The mixture was dried at 110° C. for 2 hours and at 140° C. for 5 hours in a nitrogen gas current, and then melt-kneaded at 280° C. by a biaxial screw type extruder and extruded to provide chips.

The chips were dried, spun, draw-heat-treated, knitted, scoured, preset, alkali-treated, hot-water-treated, finally set and subjected to a laundry treatment in the same manner as described in Example 1. The results of the evaluation of the antistatic property, water-absorbing rate and soil-releasing property of the resultant knitted fabric are shown in Table 2.

TABLE 2

| Example No. | Amount (% by weight) of water-insoluble Polyoxyethylene Type Polyether | Amount (% by weight) of Ionic Compound | Charge Voltage Half Value Period (seconds) | | | | Water-Absorbing Speed (seconds) | | | |
|---|---|---|---|---|---|---|---|---|---|---|
| | | | Knitted fabric A | | Knitted fabric B | | Knitted fabric A | | Knitted fabric B | |
| | | | $L_0$ | $L_{25}$ | $L_0$ | $L_{25}$ | $L_0$ | $L_{25}$ | $L_0$ | $L_{25}$ |
| Comparative Example 1 | 0 | — | >180 | >180 | >180 | >180 | >240 | >240 | >240 | >240 |
| Example 1 | 0.2 | — | 71 | 96 | 55 | 70 | 48 | 63 | 10 | 26 |
| Example 2 | 1.0 | — | 8 | 14 | 7 | 13 | 10 | 18 | 4 | 8 |
| Example 3 | 4.0 | — | 6 | 12 | 4 | 9 | 2 | 6 | 1 | 7 |
| Example 4 | 7.0 | — | 4 | 10 | 3 | 8 | 1 | 5 | 1 | 5 |
| Example 5 | 30.0 | — | 2 | 3 | 3 | 4 | 1 | 2 | 1 | 2 |
| Example 6 | 4.0 | 0.4 | 0.1 | 2.0 | 2 | 3 | 0.7 | 2 | 0.1 | 4 |
| Example 7 | 4.0 | 2.0 | 0.1 | 2.2 | 1 | 2 | 0.4 | 2 | 0.1 | 3 |
| Example 8 | 4.0 | 0.4 | 0.1 | 2.1 | 1 | 2 | 0.8 | 3 | 0.2 | 4 |
| Example 9 | 4.0 | 2.0 | 0.1 | 2.3 | 0.5 | 2 | 0.8 | 3 | 0.2 | 3 |
| Comparative Example 2 | 4.0 (PEG #20000) | 2.0 | 0.5 | 7 | >180 | >180 | 22 | 130 | 15 | >240 |
| Example 10 | 4.0 | 0.4 | 0.3 | 12 | 3 | 10 | 1.1 | 5 | 0.9 | 8 |
| Example 11 | 4.0 | 0.4 | 0.1 | 2.0 | 0.5 | 3 | 0.6 | 2 | 0.1 | 4 |
| Comparative Example 3 | 4.0 | 0.4 | 0.1 | 112 | 1 | 156 | 0.6 | 85 | 0.1 | 122 |
| Comparative Example 4 | 4.0 | 0.4 | 0.1 | >180 | 3 | >180 | 1.2 | >240 | 0.3 | >240 |
| Example 12 | 3.0 | — | 7 | 10 | 5 | 8 | 3 | 8 | 2 | 7 |

| Example No. | Amount (% by weight) of water-insoluble Polyoxyethylene Type Polyether | Amount (% by weight) of Ionic Compound | Stain Resistance | | | | | | | |
|---|---|---|---|---|---|---|---|---|---|---|
| | | | Knitted fabric A | | | | Knitted fabric B | | | |
| | | | $\Delta E^*_A$ | | $\Delta E^*_B$ | | $\Delta E^*_A$ | | $\Delta E^*_B$ | |
| | | | $L_0$ | $L_{25}$ | $L_0$ | $L_{25}$ | $L_0$ | $L_{25}$ | $L_0$ | $L_{25}$ |
| Comparative Example 1 | 0 | — | 80.2 | 81.8 | 57.3 | 57.7 | 75.1 | 76.8 | 55.3 | 56.0 |
| Example 1 | 0.2 | — | 76.7 | 76.9 | 19.2 | 19.7 | 75.0 | 76.0 | 16.4 | 16.9 |
| Example 2 | 1.0 | — | 70.8 | 71.2 | 10.8 | 11.2 | 68.3 | 68.8 | 10.8 | 11.2 |
| Example 3 | 4.0 | — | 66.5 | 66.8 | 7.6 | 8.2 | 64.4 | 64.8 | 6.4 | 6.8 |
| Example 4 | 7.0 | — | 62.4 | 63.2 | 4.8 | 5.0 | 62.3 | 62.9 | 3.7 | 4.6 |
| Example 5 | 30.0 | — | 60.0 | 60.5 | 4.0 | 4.5 | 58.2 | 59.1 | 3.3 | 4.2 |
| Example 6 | 4.0 | 0.4 | 64.3 | 64.8 | 7.4 | 7.9 | 63.5 | 64.0 | 5.9 | 6.5 |
| Example 7 | 4.0 | 2.0 | 63.9 | 64.2 | 7.2 | 7.7 | 61.8 | 62.4 | 5.4 | 5.7 |
| Example 8 | 4.0 | 0.4 | 65.3 | 61.3 | 7.5 | 8.0 | 63.9 | 64.6 | 5.6 | 6.2 |
| Example 9 | 4.0 | 2.0 | 64.8 | 65.5 | 7.0 | 7.4 | 62.4 | 63.2 | 5.0 | 5.5 |
| Comparative Example 2 | 4.0 (PEG #20000) | 2.0 | 79.1 | 80.7 | 48.2 | 55.0 | 78.1 | 79.9 | 47.2 | 53.7 |
| Example 10 | 4.0 | 0.4 | 66.2 | 68.0 | 10.2 | 15.2 | 65.0 | 67.3 | 8.2 | 12.4 |
| Example 11 | 4.0 | 0.4 | 63.2 | 63.6 | 7.0 | 7.6 | 61.0 | 61.7 | 5.5 | 6.1 |

TABLE 2-continued

|  | | | | | | | | | |
|---|---|---|---|---|---|---|---|---|---|
| Comparative Example 3 | 4.0 | 0.4 | 65.6 | 74.2 | 8.0 | 32.1 | 63.7 | 68.4 | 6.2 | 30.8 |
| Comparative Example 4 | 4.0 | 0.4 | 65.5 | 80.0 | 9.2 | 54.0 | 64.8 | 80.0 | 7.9 | 54.2 |
| Example 12 | 3.0 | — | 67.1 | 68.0 | 8.5 | 9.2 | 65.8 | 66.4 | 7.8 | 8.3 |

EXAMPLE 13

The modified polyethylene terephthalate chips prepared according to the same method as described in Example 6 was melt-extruded onto a rotary cooling drum maintained at 20° C. to form an undrawn film, and subsequently, the undrawn film was drawn at a draw ratio of 3.6 in the axial direction of-the machine and then drawn at a draw ratio of 3.9 in the transverse direction at 105° C. The drawn film was heat-treated at 205° C. to provide a biaxially oriented polyester film having a thickness of 14 μm. The surface resistivity value of the film was $2.2 \times 10^{11}$ Ω/□. Little foreign substances adhered to the film, and the film was an antistatic film having an excellent water resistance.

EXAMPLES 14 THROUGH 16 AND REFERENTIAL EXAMPLE 1

In each of Examples 14 to 16 and Referential Example 1, the same procedures as in Example 1, were repeated except that as a phosphite type antioxidant, tris(2,4-di-t-butylphenyl) phosphite was added in the amount shown in Table 3, together with the water-insoluble polyoxyethylene type polyether. The resultant chips had an intrinsic viscosity of 0.643 to 0.651 and a softening point of 261° to 263° C.

According to customary procedures, the chips were

EXAMPLE 17

The same procedures as in Example 16 were repeated except that 0.4 parts of sodium alkyl-sulfonate having 8 to 20 carbon atoms and an average carbon atom number of 14 was newly added as an ionic compound under vacuum, 10 minutes after the stage at which the degree of vacuum reached 3 mmHg during the process of the reduction of the pressure for the polymerization reaction. The test results are shown in Table 3.

EXAMPLE 18

The same procedures as in Example 17 were repeated except that tetrabutylphosphonium dodecylbenzenesulfonate was used instead of the sodium alkyl-sulfonate used as an ionic compound. The test results are shown in Table 3.

EXAMPLES 19 THROUGH 21

The same procedures as in Example 17 were repeated except that disterarylpentaerythritol diphosphite (Example 19), bis(2,6-di-t-butyl-4-methylphenyl)-pentaerythritol diphosphite (Example 20) or 4,4'-butylidene-bis(3-methyl-6-t-butylphenyl-di-tridecylphosphite (Example 21) was used instead of tris(2,4-di-t-butylphenyl) phosphite as a phosphite type antioxidant. The test results are shown in Table 3.

TABLE 3

| | Items | | | | | | | | | | | | | | | | |
|---|---|---|---|---|---|---|---|---|---|---|---|---|---|---|---|---|---|
| | Amount (% by weight) of water-insoluble Polyoxyethylene | Amount (% by weight) of Phosphite | Charge Voltage Half Value Period (seconds) | | | | Water-Absorbing Speed (seconds) | | | | Stain Resistance | | | | | | | |
| | | | | | | | | | | | Knitted fabric A | | | | Knitted fabric B | | | |
| | Type Poly | Type | Knitted fabric A | | Knitted fabric B | | Knitted fabric A | | Knitted fabric B | | $\Delta E^*_A$ | | $\Delta E^*_B$ | | $\Delta E^*_A$ | | $\Delta E^*_B$ | |
| Example No. | ether/Ionic Compound | Anti-oxidant | $L_0$ | $L_{25}$ | $L_0$ | $L_{25}$ | $L_0$ | $L_{25}$ | $L_0$ | $L_{25}$ | $L_0$ | $L_{25}$ | $L_0$ | $L_{25}$ | $L_0$ | $L_{25}$ | $L_0$ | $L_{25}$ |
| Referential Example 1 | 4.0/0 | 0 | 10 | 16 | 56 | >180 | 45 | 125 | 123 | 240 | 77.0 | 79.1 | 38.4 | 50.3 | 78.2 | 80.2 | 39.0 | 50.0 |
| Example 14 | 4.0/0 | 0.02 | 10 | 15 | 40 | 85 | 21 | 52 | 56 | 115 | 70.4 | 71.9 | 26.9 | 27.2 | 71.3 | 76.0 | 26.3 | 26.5 |
| Example 15 | 4.0/0 | 0.2 | 9 | 14 | 10 | 18 | 10 | 15 | 11 | 14 | 68.1 | 67.8 | 22.3 | 22.8 | 67.3 | 67.0 | 20.5 | 21.2 |
| Example 16 | 4.0/0 | 0.4 | 9 | 10 | 10 | 17 | 9 | 13 | 10 | 13 | 67.4 | 67.5 | 20.1 | 21.0 | 66.8 | 67.2 | 19.5 | 20.1 |
| Example 17 | 4.0/0.4 | 0.4 | 0.2 | 1 | 5 | 11 | 6 | 11 | 5 | 10 | 67.2 | 67.1 | 19.7 | 20.3 | 66.4 | 66.9 | 19.1 | 19.8 |
| Example 18 | 4.0/0.4 | 0.4 | 0.2 | 1 | 7 | 12 | 7 | 12 | 6 | 11 | 67.9 | 68.8 | 21.2 | 21.8 | 67.0 | 67.6 | 20.6 | 21.2 |
| Example 19 | 4.0/0.4 | 0.4 | 0.3 | 2 | 6 | 12 | 7 | 11 | 7 | 10 | 68.2 | 68.3 | 22.0 | 22.5 | 67.2 | 67.8 | 21.1 | 21.9 |
| Example 20 | 4.0/0.4 | 0.4 | 0.3 | 2 | 7 | 11 | 8 | 12 | 7 | 12 | 68.3 | 68.1 | 23.5 | 24.0 | 66.1 | 66.7 | 21.8 | 22.2 |
| Example 21 | 4.0/0.4 | 0.4 | 0.4 | 2 | 8 | 13 | 9 | 13 | 8 | 13 | 69.0 | 68.8 | 23.9 | 24.5 | 68.2 | 68.8 | 22.5 | 23.1 | dried, and melted at 300° C. and subjected to a high-speed spinning operation by using a spinneret having 72 circular spinning holes having a diameter of 0.15 mm, at an extrusion rate of 13.5 g/min and a take-up speed of 3800 m/min to provide a 32 denier/72 filament ultrafine filament yarn (the thickness of the individual filament was 0.44 denier).

A knitted fabric was prepared from this ultrafine filament yarn in the same manner as described in Example 1, and the antistatic property, water-absorbing speed and soil-releasing property of the resultant knitted fabric were measured. The test results are shown in Table 3.

EXAMPLES 22 THROUGH 25 AND REFERENTIAL EXAMPLES 2 AND 3

In each of Examples 22 to 25 and Referential Examples 2 and 3, the same procedures as in Example 1 were repeated except that the antimony trioxide used as a polycondensation catalyst was replaced by 0.493 part (0.020 mole % based on dimethyl terephthalate) of titanium trimellitate in the form of an ethylene glycol solution having a concentration of 1% thereof in terms of titanium atom, and the antimony compound shown in Table 4 in the amount shown in Table 4. The resultant chips had an intrinsic viscosity of 0.640 to 0.656 and a softening point of 260° to 263° C.

According to customary procedures, the chips were dried, melted and subjected to a high-speed spinning operation by using a spinneret having 72 circular extrusion holes having a diameter of 0.15 mm, at an extrusion rate of 13.5 g/min at a take-up speed of 3800 m/min to provide a 32-denier/72-filament ultrafine filament yarn (the thickness of the individual filament was 0.44 denier).

In the same manner as described in Example 1, the filament yarns were knitted, scoured, present, alkali-weight-reduced, finally set and subjected to a laundry-heat treatment. The results of the tests on the antistatic property, water-absorbing speed and soil-releasing property of the knitted fabric are shown in Table 4.

REFERENTIAL EXAMPLE 4

The same procedures as in Example 22 were carried out except the polymer produced by using titanium trimellitate as a polycondensation catalyst and subjected to the melt-spinning operation was replaced by the same polymer as described in Example 1 and produced by using a polycondensation catalyst consisting of antimony trioxide.

The test results are shown in Table 4.

EXAMPLE 26

The same procedures as in Example 22 were repeated except that 10 minutes after the stage at which the degree of vacuum reached 3 mmHg in the process of reduction of pressure for the polymerization reaction, 0.4 part of sodium alkylsulfonate having 8 to 20 carbon atoms and an average carbon atom number of 14 was newly added as the ionic compound under vacuum. The results are shown in Table 4.

EXAMPLE 27

The same procedures as in Example 26 were repeated except that tetrabutylphosphonium dodecylbenzenesulfonate was used as an ionic compound instead of the sodium alkylsulfonate. The results are shown in Table 4.

EXAMPLE 28

The same procedures as in Example 26 were repeated except that 1.539 parts (0.040 mole % based on dimethyl terephthalate) of germanium oxide in the form of a 1.4% aqueous solution was used as a polycondensation catalyst instead of titanium trimellitate. The results are shown in Table 4.

EXAMPLE 29

The same procedures as in Example 26 were repeated except that 0.4 part of tris(2,4-di-t-butylphenyl) phosphite was added as a phosphite type antioxidant together with the water-insoluble polyoxyethylene type polyether. The test results are shown in Table 4.

TABLE 4

| Example No. | Antimony Compound Kind | Sb (ppm) | Water-insoluble Polyoxyethylene Type Polyether (% by weight) | Ionic Compound (% by weight) | Charge Voltage Half Value Period (seconds) Knitted fabric A $L_0$ | $L_{25}$ | Knitted fabric B $L_0$ | $L_{25}$ | Water-Absorbing Speed (seconds) Knitted fabric A $L_0$ | $L_{25}$ | Knitted fabric B $L_0$ | $L_{25}$ |
|---|---|---|---|---|---|---|---|---|---|---|---|---|
| Example 22 | — | 0 | 4.0 | — | 7 | 10 | 7 | 9 | 3 | 6 | 2 | 3 |
| Example 23 | $Sb_2O_3$ | 10 | 4.0 | — | 9 | 12 | 8 | 11 | 3 | 6 | 2 | 3 |
| Example 24 | $Sb_2O_3$ | 30 | 4.0 | — | 10 | 12 | 9 | 11 | 2 | 5 | 2 | 4 |
| Referential Example 2 | $Sb_2O_3$ | 50 | 4.0 | — | 9 | 22 | 35 | >180 | 3 | 6 | 62 | >240 |
| Example 25 | Antimony acetate | 30 | 4.0 | — | 8 | 10 | 8 | 10 | 3 | 7 | 2 | 6 |
| Referential Example 3 | Antimony acetate | 50 | 4.0 | — | 9 | 28 | 24 | >180 | 3 | 8 | 85 | >240 |
| Referential Example 4 | $Sb_2O_3$ | 340 | 4.0 | — | 10 | 43 | 56 | >180 | 45 | 125 | 123 | >240 |
| Example 26 | — | 0 | 4.0 | 0.4 | 0.2 | 2 | 1 | 5 | 0.5 | 2 | 0.2 | 1 |
| Example 27 | — | 0 | 4.0 | 0.4 | 0.3 | 3 | 2 | 7 | 0.8 | 3 | 0.2 | 2 |
| Example 28 | — | 0 | 4.0 | 0.4 | 0.3 | 2 | 2 | 7 | 0.6 | 3 | 0.3 | 2 |
| Example 29 | — | 0 | 4.0 | 0.4 | 0.2 | 2 | 0.6 | 4 | 0.3 | 2 | 0.1 | 1 |

| Example No. | Antimony Compound Kind | Sb (ppm) | Stain Resistance Knitted fabric A $\Delta E^*_A$ $L_0$ | $L_{25}$ | $\Delta E^*_B$ $L_0$ | $L_{25}$ | Knitted fabric B $\Delta E^*_A$ $L_0$ | $L_{25}$ | $\Delta E^*_B$ $L_0$ | $L_{25}$ |
|---|---|---|---|---|---|---|---|---|---|---|
| Example 22 | — | 0 | 66.1 | 66.6 | 12.3 | 12.8 | 64.2 | 64.7 | 11.8 | 12.2 |
| Example 23 | $Sb_2O_3$ | 10 | 66.4 | 67.0 | 12.4 | 12.9 | 64.3 | 64.8 | 11.6 | 12.0 |
| Example 24 | $Sb_2O_3$ | 30 | 67.3 | 67.7 | 12.8 | 13.6 | 65.1 | 65.7 | 12.0 | 12.8 |
| Referential Example 2 | $Sb_2O_3$ | 50 | 72.1 | 78.9 | 23.9 | 48.2 | 74.8 | 79.9 | 22.6 | 47.5 |
| Example 25 | Antimony acetate | 30 | 66.8 | 67.4 | 11.5 | 12.1 | 64.7 | 65.3 | 11.0 | 11.7 |
| Referential Example 3 | Antimony acetate | 50 | 69.5 | 77.0 | 20.9 | 46.2 | 70.5 | 78.1 | 19.7 | 48.1 |
| Referential Example 4 | $Sb_2O_3$ | 340 | 77.0 | 80.2 | 38.4 | 50.2 | 78.2 | 81.5 | 39.0 | 52.0 |
| Example 26 | — | 0 | 65.1 | 65.8 | 10.1 | 10.2 | 64.8 | 65.1 | 9.6 | 10.2 |
| Example 27 | — | 0 | 67.0 | 67.6 | 11.8 | 11.9 | 66.9 | 67.3 | 10.4 | 10.9 |
| Example 28 | — | 0 | 66.0 | 66.3 | 10.6 | 11.0 | 65.6 | 66.2 | 9.8 | 10.4 |

| | TABLE 4-continued | | | | | | | | |
|---|---|---|---|---|---|---|---|---|---|
| Example 29 | — | 0 | 64.6 | 65.3 | 9.6 | 10.2 | 63.7 | 64.2 | 8.9 | 9.6 |

EXAMPLE 30

An ester exchange reaction vessel was charged with 100 parts of dimethyl terephthalate, 60 parts of ethylene glycol, 0.06 part (0.066 mole % based on dimethyl terephthalate) of calcium acetate monohydrate and 0.009 part (0.007 mole % based on dimethyl terephthalate) of cobalt acetate tetrahydrate as the color-adjusting agent, and the resultant reaction mixture was subjected to an ester exchange reaction by elevating the temperature of the reaction mixture from 140° C. to 220° C. over a period of 4 hours in a nitrogen gas atmosphere while methanol formed in the reaction, vessel was removed to the outside of the vessel by distillation. After termination of the ester exchange reaction, 0.058 part (0.080 mole % based on dimethyl terephthalate) of trimethyl phosphate as a stabilizer and 0.024 part of dimethylpolysiloxane as a defoaming agent were added to the reaction mixture. Next, 10 minutes after, 0.493 part of a 1% solution of titanium trimellitate (0.020 mole %, in terms of titanium atom, based on the molar amount of dimethyl terephthalate) in ethylene glycol was added to the reaction mixture, and the temperature was elevated to 240° C. simultaneously while excessive ethylene glycol was removed by distillation. Then, the reaction mixture was transferred into a polymerization reaction vessel, and 2 parts of a water-insoluble polyoxyethylene polyether polymer represented by the formula:

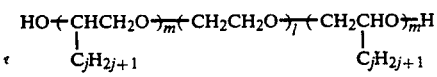

wherein j is an integer of 18 to 28 (average: 21), l is 115 in average and m is 10 in average, and having a number average molecular weight of 11838, a diluted solution viscosity of 0.19 and a ratio $\{m[M(R^1O)]+[M(R^2)]\}/44$ l of 1.35, and 0.8 part of sodium dibutylnaphthalenesulfonate were added to the reaction mixture.

The pressure in the reaction vessel was reduced from 760 mmHg to 1 mmHg over a period of 1 hour, and simultaneously, the temperature of the reaction mixture was elevated from 240° C. to 280° C. over a period of 1 hour and 30 minutes. The polymerization was further conducted for 2 hours at a polymerization temperature of 280° C. under a reduced pressure of 1 mmHg or less, and at this stage, 0.4 part of a phosphite type antioxidant consisting off tris(2,4-di-tert-butylphenyl)phosphite and another type antioxidant consisting of 0.1 part of Cyanox 1790 (trademark, made by American Cyanamid) and 0.3 part of Mark AO-412S (trademark, supplied from Adeca Argus Chemical) were added to the reaction mixture under vacuum. Then, the polymerization was further continued for 30 minutes. The resultant polymer had an intrinsic viscosity of 0.645, and a softening point of 259° C. The polymer was formed into chips according to a customary procedures.

The resultant chips were dried according to a customary procedure, melted at a temperature of 285° C. by using an extruding spinning machine having a spinneret having 36 circular spinning holes having a diameter of 0.3 mm, and extruded at an extrusion rate of 37.5 g/min at a take-up speed of 1500 m/min. The resultant undrawn filament yarn was supplied to a drawing and heat-treating machine having a heating roller maintained at 80° C. and a plate heater maintained at 160° C. and was subjected to a drawing and heat treatment at a draw ratio that causing the resultant drawn filament yarn to exhibit an ultimate elongation of 30%, whereby a drawn filament yarn having a yarn count of 75 deniers/36 filaments was obtained.

A hosiery knitted fabric was prepared by using the resultant drawn filament yarn, and the fabric was scoured and preset at 180° C. for 45 seconds to obtain a knitted fabric A by customary procedures. After the above-mentioned presetting treatment, the knitted fabric was treated at a boiling temperature in an aqueous solution containing 3.5% of sodium hydroxide to obtain a knitted fabric B having a weight reduction of 20%.

The knitted fabrics A and B were dyed in a dyeing liquid containing 4% (based on the weight of the fabric) of a disperse blue dye (available under the trademark of Sumikalon Navy Blue S-2GL, from Sumitomo Chemical, 0.5 g/l of a dispersing agent available under the trademark of Disper VG, from Meisei Kagaku Kogyo, and 0.3 g/l of acetic acid, at a liquor ratio of 1:50 and at a temperature of 130° C. for 60 minutes. Then, the dyed fabrics were reduction-washed in an aqueous cleaning liquid containing 1 g/l of sodium hydroxide and 1 g/l of sodium hydrosulfite at a temperature of 70° C. for 20 minutes.

Blue colored fabrics were obtained.

With respect to the resultant knitted fabrics A and B, the antistatic property [friction electrification voltage], the luminous dyeing property and the fibrilizing resistance were determined after 0 cycle ($L_O$) of laundry treatment and 30 cycles ($L_{30}$) of laundry treatment. The results are shown in Table 5.

EXAMPLE 31

The same procedures as in Example 30 were carried out, except that the sodium dibutylnaphthalene sulfonate was replaced by 0.8 part of diotylnaphthalene solfonate. The test results are shown in Table 5.

EXAMPLE 32

The same procedures as in Example 30 were carried out except that the sodium dibutylnaphthalenesulfonate was replaced by 0.8 part of lithium tert-butylbenzenesulfonate.

The test results are indicated in Table 5.

EXAMPLE 33

The same procedures as in Example 30 were carried out except that the sodium dibutylnaphthalenesulfonate was replaced by 0.8 part of lithium dodecylbenzenesulfonate (hard type).

The test results are shown in Table 5.

EXAMPLE 34

The same procedures as in Example 30 were carried out except that the sodium dibutylnaphthalenesulfonate was replaced by 0.8 part of sodium dodecylbenzenesulfonate (hard type).

The test results are shown in Table 5.

EXAMPLE 35

The same procedures as in Example 30 were carried out except that the sodium dibutylnaphthalenesulfonate was replaced by 0.8 part of lithium dibutylnaphthalenesulfonate.

EXAMPLE 36

The same procedures as in Example 30 were carried out except that the sodium dibutylnaphthalenesulfonate was replaced by 0.8 part of mixed sodium alkylsulfonates having 8 to 20 carbon atoms (average: 14).

The test results are shown in Table 5.

EXAMPLE 37

The same procedures as in Example 30 were carried out except that the sodium dibutylnaphthalenesulfonate was replaced by 0.8 part of tetrabutylphosphonium dodecylbenzenesulfonate.

The test results are shown in Table 5.

EXAMPLE 38

The same procedures as in Example 30 were carried out except that the sodium dibutylnaphthalenesulfonate was replaced by 0.8 part of mixed tetrabutylphosphonium alkylsulfonates having 8 to 20 carbon atoms (average: 14).

The test results are shown in Table 5.

EXAMPLE 39

The same procedures as in Example 30 were carried out except that the sodium dibutylnaphthalenesulfonate was replaced by 0.8 part of the organic sulfonic acid salt compound of the formula:

$$C_{12}H_{25}O(CH_2CH_2O)_{10}CH_2CH_2SO_3Na$$

The test results are shown in Table 5.

EXAMPLE 40

The same procedures as in Example 30 were carried out except that the sodium dibutylnaphthalenesulfonate was replaced by 0.8 part of the organic sulfonic acid salt compound of the formula:

$$C_{12}H_{25}O(CH_2CH_2O)_{10}CH_2CH_2SO_3^{\oplus}P^{\ominus}(C_4H_9)_4$$

The test results are indicated in Table 5.

REFERENTIAL EXAMPLE 5

The same procedures as in Example 30 were carried out except that the sodium dibutylnaphthalenesulfonate was omitted.

The test results are shown in Table 5.

COMPARATIVE EXAMPLE 5

The same procedures as in Example 30 were carried out with the following exceptions.

The water-insoluble polyoxyethylene polyether polymer was replaced by 2 parts of a polyoxyethylene glycol having a number average molecular weight of 20,000.

The sodium dibutylnaphthalenesulfonate was replaced by 0.8 parts of mixed sodium alkylsulfonates having 8 to 20 carbon atoms (average: 14).

The resultant polymer chip had an intrinsic viscosity of 0.640 and a softening point of 261° C.

The polymer chips were dried by a customary method and melt-spun through a spinneret for hollow filaments, having 24 spinning orifices each compound of four arc-shaped slits having a width of 0.15 mm, arranged on a circle having a diameter of 1.0 mm and spaced 0.04 mm from each other, at a temperature of 295° C.

The resultant undrawn hollow filament yarn was drawn and heat-treated. The drawn and heat treated filaments had a hollow cross-sectional profile with a volume percentage of the hollow of 6% and the filament yarn had a yarn count of 75 deniers/24 filaments.

The hollow filament yarn was knitted, scoured, preset, alkali-treated, dyed, reduction-washed, and tested in the same manner as in Example 30.

The test results are indicated in Table 5.

COMPARATIVE EXAMPLE 6

The same procedures as in Example 30 were carried out with the following exceptions.

The water-insoluble polyoxyethylene polyether polymer was replaced by a compound of the formula:

$$HO+CHCH_2O\underset{\underset{C_7H_{2j+1}}{|}}{)_m}(CH_2CH_2O)_l(CH_2CHO\underset{\underset{C_jH_{2j+1}}{|}}{)_m}H$$

in which formula j represents an integer of from 18 to 28 and 21 in average, l represents an integer of 270 in average, and m represents an integer of 8 in average, and having a number average molecular weight of 17306, a diluted solution viscosity of 0.25 and a ratio $\}m[M(R^1O)]+[M(R^2)]\}/44$ l of 0.46.

The test results are shown in Table 5.

COMPARATIVE EXAMPLE 7

The same procedures as in Example 30 were carried out except that the water-insoluble polyoxyethylene polyether polymer was replaced by a water-insoluble compound of the formula:

$$HO+CHCH_2O\underset{\underset{C_7H_{2j+1}}{|}}{)_m}(CH_2CH_2O)_l(CH_2CHO\underset{\underset{C_jH_{2j+1}}{|}}{)_m}H$$

wherein j is an integer of 18 to 28, and 21 in average, l is an integer of 80 in average and m is an integer of 16 in average, and having a number average molecular weight of 14354, a dilute solution viscosity of 0.22 and a ratio $\{m[M(R^1O)]+[M(R^2)]\}/44$ l of 3.11.

The test results are indicated in Table 5.

TABLE 5

| Example No. | Polyoxyethylene polyether polymer Type | Amount (wt part) | Organic sulfonate compound Type | Amount (wt part) | Friction electrification voltage of alkali-treated fabric |  |  |  |
|---|---|---|---|---|---|---|---|---|
|  |  |  |  |  | No weight reduction |  | 20% weight reduction |  |
|  |  |  |  |  | $L_0$ | $L_{30}$ | $L_0$ | $L_{30}$ |
| Example 30 | Water-insoluble | 2.0 | Na-dibutylnaphthalenesulfonate | 0.8 | 600 | 1350 | 800 | 1150 |

TABLE 5-continued

| | Polyoxyethylene polyether polymer | Amount (wt part) | Surfactant | | | | | |
|---|---|---|---|---|---|---|---|---|
| Example 31 | Water-insoluble polyoxyethylene polyether polymer | 2.0 | Na-dioctylnaphthalenesulfonate | 0.8 | 700 | 1500 | 750 | 1200 |
| Example 32 | Water-insoluble polyoxyethylene polyether polymer | 2.0 | Li-tert-butylbenzenesulfonate | 0.8 | 850 | 1500 | 1100 | 1450 |
| Example 33 | Water-insoluble polyoxyethylene polyether polymer | 2.0 | Li-dodecylbenzenesulfonate | 0.8 | 900 | 1500 | 1150 | 1500 |
| Example 34 | Water-insoluble polyoxyethylene polyether polymer | 2.0 | Na-dodecylbenzenenesulfonate | 0.8 | 2000 | 2500 | 1800 | 2050 |
| Example 35 | Water-insoluble polyoxyethylene polyether polymer | 2.0 | Li-dibutylnaphthalenesulfonate | 0.8 | 300 | 1050 | 400 | 900 |
| Example 36 | Water-insoluble polyoxyethylene polyether polymer | 2.0 | Na-alkylsulfonates | 0.8 | 2200 | 2700 | 2100 | 2500 |
| Example 37 | Water-insoluble polyoxyethylene polyether polymer | 2.0 | Tetrabutylphosphonium dodecyl-benzenesulfonate | 0.8 | 800 | 1800 | 900 | 1950 |
| Example 38 | Water-insoluble polyoxyethylene polyether polymer | 2.0 | Tetrabutylphosphonium alkyl-sulfonates | 0.8 | 1000 | 1850 | 1050 | 1900 |
| Example 39 | Water-insoluble polyoxyethylene polyether polymer | 2.0 | $C_{12}H_{25}O(CH_2CH_2O)_{10}CH_2CH_2$—$SO_3Na$ | 0.8 | 500 | 1400 | 500 | 1050 |
| Example 40 | Water-insoluble polyoxyethylene polyether polymer | 2.0 | $C_{12}H_{25}O(CH_2CH_2O)_{10}CH_2CH_2$—$SO_3P(C_4H_9)_4$ | 0.8 | 400 | 1350 | 500 | 950 |
| Referential Example 5 | Water-insoluble polyoxyethylene polyether polymer | 2.0 | — | 0 | 2500 | 2800 | 2300 | 2900 |
| Comparative Example 5 | PEG #20,000 (*)₁ | 2.0 | Na-alkylsulfonates | 0.8 | 1250 | 1500 | 2200 | 2500 |
| Comparative Example 6 | Water-insoluble polyoxyethylene polyether polymer | 2.0 | Na-dibutylnaphthalenesulfonate | 0.8 | 2400 | 2800 | 2400 | 3500 |
| Comparative Example 7 | Water-insoluble polyoxyethylene polyether polymer | 2.0 | Na-dibutylnaphthalenesulfonate | 0.8 | 2600 | 2900 | 2500 | 3200 |

| | Item | | | | | |
|---|---|---|---|---|---|---|
| | Polyoxyethylene polyether polymer | | Dyeing property ($L^*$ value) of alkali-treated fabric | | Frictional resistance of alkali-treated fabric (*)₂ | |
| Example No. | Type | Amount (wt part) | No weight reduction | 20% weight reduction | No weight reduction | 20% weight reduction |
| Example 30 | Water-insoluble polyoxyethylene polyether polymer | 2.0 | 24 | 26 | 5 | 4–5 |
| Example 31 | Water-insoluble polyoxyethylene polyether polymer | 2.0 | 24 | 26 | 5 | 4–5 |
| Example 32 | Water-insoluble polyoxyethylene polyether polymer | 2.0 | 24 | 27 | 5 | 4–5 |
| Example 33 | Water-insoluble polyoxyethylene polyether polymer | 2.0 | 24 | 27 | 5 | 4–5 |
| Example 34 | Water-insoluble polyoxyethylene polyether polymer | 2.0 | 24 | 33 | 5 | 4 |
| Example 35 | Water-insoluble polyoxyethylene polyether polymer | 2.0 | 24 | 26 | 5 | 4–5 |
| Example 36 | Water-insoluble polyoxyethylene polyether polymer | 2.0 | 26 | 35 | 5 | 3–4 |
| Example 37 | Water-insoluble polyoxyethylene polyether polymer | 2.0 | 24 | 31 | 5 | 4 |
| Example 38 | Water-insoluble polyoxyethylene polyether polymer | 2.0 | 24 | 31 | 5 | 3–4 |
| Example 39 | Water-insoluble polyoxyethylene polyether polymer | 2.0 | 25 | 32 | 4–5 | 3–4 |
| Example 40 | Water-insoluble polyoxyethylene | 2.0 | 24 | 30 | 4–5 | 3–4 |

TABLE 5-continued

| | | | | | | |
|---|---|---|---|---|---|---|
| Referential Example 5 | polyether polymer Water-insoluble polyoxyethylene polyether polymer | 2.0 | 24 | 25 | 5 | 3-5 |
| Comparative Example 5 | PEG #20,000 (*)₁ | 2.0 | 24 | 29 | 5 | 3 |
| Comparative Example 6 | Water-insoluble polyoxyethylene polyether polymer | 2.0 | 24 | 42 | 4-5 | 1 |
| Comparative Example 7 | Water-insoluble polyoxyethylene polyether polymer | 2.0 | 24 | 40 | 4-5 | 1-2 |

Note:
(*)₁Polyoxyethylene glycol having a number average molecular weight of 20,000
(*)₂Class 1 to 5, 5 ... best, 1 ... worst

EXAMPLE 41

The same procedures as in Example 30 were carried out with the following exceptions.

The same polyethylene terephthalate composition chips as in Example 30 were melt extruded to a peripheral surface of a rotation cooling drum having a controlled temperature of 20° C. to form a undrawn film.

The undrawn film was drawn at a draw ratio of 3.6 at a temperature off 0.5° C. in the longitudinal direction of the film and then at a draw ratio of 3.9 at a temperature of 105° C. in the transversal direction of the film.

The drawn film was heat-treated at a temperature of 205° C. for 5 seconds.

A biaxially oriented polyester composition film having a thickness of 14 $\mu$m was obtained.

This film had a surface resistivity value of $7.5 \times 10^{10}$ $\Omega/\square$ and a high resistance to an adhesion of foreign substances to the film, and to hot water, and therefore, was useful as an antistatic film.

EXAMPLE 42

A dry blend was prepared from 100 parts of a polybutylene terephthalate resin containing 0.2% by weight of Irganox 1076 (a trademark of an antioxidant, made by Ciba Geigy) and having an intrinsic viscosity of 0.88 and a softening point of 226° C., 1.0 part of the same water-insoluble polyoxyethylene polyether polymer as in Example 1, and 1.0 part of sodium nonylnaphthalenesulfonate.

The dry blend was subjected to a five ounce screw in line type injection molding machine at a temperature of 250° C. to form square plates having a length of 60 nml, a width of 60 mm and a thickness of 3 mm.

The square plates were subjected to a measurement of the surface resistivity values before and after the plates were treated in boiling water for 30 hours and dried.

The plates exhibited an initial surface resistivity value of $2.5 \times 10^{11}$ $\Omega/\square$ and a surface resistivity value after the boiling water treatment of $2.5 \times 10^{11}$ $\Omega\square$.

Accordingly, it was confirmed that the surface resistivity value of the polyester composition plates was not affected by the boiling water treatment. Namely, the polyester composition plates exhibited an excellent initial antistatic property and hot water resistance.

EXAMPLE 43

The same procedures as in Example 42 were carried out except that the sodium nonylnaphthalenesulfonate was not employed.

The resultant polyester composition plates exhibited an initial surface resistivity value of $3.7 \times 10^{12}$ $\Omega/\square$ and a surface resistivity value after the boiling water treatment of $3.8 \times 10^{12}$ $\Omega\square$.

COMPARATIVE EXAMPLE 8

The same procedures as in Example 42 were carried out except-thai the water-insoluble polyoxyethylene polyether polymer was replaced by 1.0 part of a water-soluble polyoxyethylene glycol having a number average molecular weight of 20,000, and the sodium nonylbenzenesulfonate was replaced by 1.0 part of sodium dodecylbenzenesulfonate.

The resultant polyester composition plates exhibited an initial surface resistivity value of $9.2 \times 10^{11}$ $\Omega/\square$ and a surface resistivity value after the boiling water treatment of $8.6 \times 10^{12}$ $\Omega/\square$. That is, the hot water resistance of the plates was unsatisfactory.

EXAMPLE 44 TO 47

In each of Examples 44 to 47, an ester exchange reaction vessel was charged with 100 parts of dimethyl terephthalate, 60 parts of ethylene glycol, 0.06 part (0.066 mole % based on dimethyl terephthalate) of calcium acetate monohydrate and 0.009 part (0.007 mole % based on dimethyl terephthalate) of cobalt acetate tetrahydrate as the color-adjusting agent, and the resultant reaction mixture was subjected to an ester exchange reaction by elevating the temperature of the reaction mixture from 140° C. to 220° C. over a period of 4 hours in a nitrogen gas atmosphere while methanol formed in the reaction vessel was removed to the outside of the vessel by distillation. After termination of the ester exchange reaction, 0.058 part (0.080 mole % based on dimethyl terephthalate) of trimethyl phosphate as a stabilizer and 0.024 part of dimethylpolysiloxane as a defoaming agent were added to the reaction mixture. Next, 10 minutes after, 0.04 part (0.027 molar % based on dimethyl terephthalate) of antimony trioxide was added to the reaction mixture, and the temperature was elevated to 240° C. simultaneously while excessive ethylene glycol was removed by distillation. Then, the reaction mixture was transferred into a polymerization reaction vessel, and a water-insoluble polyoxyethylene polyether polymer represented by the formula:

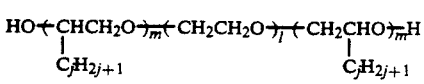

wherein j is an integer of 18 to 28 (average: 21), l is 115 in average and m is 10 in average, and having a number average molecular weight of 11838, a diluted solution viscosity of 0.19 and a ratio $\{m[M(R^1O)]+[M(R^2)]\}/44$ 1 of 1.35, was added in the amount as indicted in Table 6 to the reaction mixture.

The pressure in the reaction vessel was reduced from 760 mmHg to 1 mmHg over a period of 1 hour, and simultaneously, the temperature of the reaction mixture was elevated from 240° C. to.280° C. over a period of 1 hour and 30 minutes. The polymerization was further conducted for 2 hours at a polymerization temperature of 280° C. under a reduced pressure of 1 mmHg or less, and at this stage, 0.1 part of Cyanox 1790 (trademark, made by American Cyanamid) and 0.3 part of Mark AO-412S (trademark, supplied from Adeca Argus Chemical) were added to the reaction mixture under vacuum. Then, the polymerization was further continued for 30 minutes. The resultant polymer had an intrinsic viscosity of 0.648, and a softening point of 261° C. to 262° C. The polymer, was formed into chips according to a customary procedures.

The resultant chips were dried according to a customary procedure, melt-extruded at a temperature of 285° C. through an extruding spinning machine having a spinneret having 24 circular spinning holes having a diameter of 0.3 mm. The resultant undrawn filament yarn was supplied to a drawing and heat-treating machine having a heating roller maintained at 80° C. and a plate heater maintained at 160° C. and was subjected to a drawing and heat treatment at a draw ratio that causing the resultant drawn filament yarn to exhibit an ultimate elongation of 30%, whereby a drawn filament yarn having a yarn count of 75 deniers/24 filaments was obtained.

A hosiery knitted fabric was prepared by using the resultant drawn filament yarn, and the fabric was scoured and preset at 180° C. for 45 seconds to obtain a knitted fabric A by customary procedures. After the above-mentioned presetting treatment, the knitted fabric was treated at a boiling temperature in an aqueous solution containing 3.5% of sodium hydroxide to obtain a knitted fabric B having a weight reduction of 20%.

The knitted fabrics A and B were treated in hot pure water, instead of a dying step, at a temperature of 130° C. for 60 minutes, The treated fabrics A and B were subjected to a final heat set at a temperature of 160° C. for 45 seconds.

With respect to the resultant knitted fabrics A and B, the moisture absorption at a temperature of 20° C. and a relative humidity of 92% was determined after 0 cycle ($L_0$) of laundry treatment and 25 cycles ($L_{25}$) of laundry treatment. The results are shown in Table 6.

EXAMPLE 48

The same procedures as in Example 46 were carried out with the following exceptions.

A water-insoluble polyoxyethylene type polyester represented by the formula:

$$\text{Ph}-O(CH_2CH_2O)_l(CH_2CHO)_mH \quad | \quad C_jH_{2j+1}$$

wherein j represents an integer of 10 to 12 (average: 11), l is about 100 in average, and m is 20 in average, and having a number average molecular weight of 8454, a diluted solution viscosity of 0.15 and a ratio $\{m[M(R^1O)]+[M(R^2)]\}/44\ l$ of 0.90 was used instead of the water-insoluble polyoxyethylene polyether.

The results are shown in Table 6.

EXAMPLE 49

The same procedures as in Example 45 were carried out except that sodium alkylsulfonate having 8 to 20 carbon atoms and an average carbon atom number of 14 was added as an ionic compound in an amount of 2 parts by weight under vacuum 10 minutes after the stage at which the degree of vacuum reached 3 mmHg in the process of the reduction of the pressure for the polymerization reaction.

The results are shown in Table 6.

EXAMPLE 50

The same procedures as in Example 49 were carried out except that the sodium alkyl-sulfonate was replaced by tetrabulylphoshonium dodecylbenzenesulfonate.

The results are shown in Table 6.

EXAMPLE 51

The same procedures as in Example 50 were carried out except that the weight reduction treatment was carried out in an aqueous solution of 40% by weight of monoethylamine instead of the alkali, at a constant temperature of 30° C.

The results are shown in Table 6.

EXAMPLE 52

The same procedures as in Example 50 were carried out with the following exceptions.

The weight reduction treatment was carried out in an aqueous solution of 40% by weight of monoethylamine instead of the alkali at a temperature of 30° C. to an extent such that the weight reduction reached 5% by weight, and after a through washing cooperation, in an aqueous solution of 1.0% by weight of sodium hydroxide at a boiling temperature of the solution to an extent such that the total weight reduction became 20% by weight.

The results are shown in Table 6.

COMPARATIVE EXAMPLE 9

The same procedures as described in Example 50 were carried out except that the water-insoluble polyoxyethylene polyether was replaced by a polyoxyethyleneglycol having a number average molecular weight of 8,000.

The results are shown in Table 6.

COMPARATIVE EXAMPLE 10

The same procedures as in Example 50 were carried out with the following exceptions.

The water-insoluble polyoxyethylene polyether polymer was replaced by a compound of the formula:

$$HO(CHCH_2O)_m(CH_2CH_2O)_l(CH_2CHO)_mH$$
$$|\qquad\qquad\qquad\qquad\qquad\qquad\ |$$
$$C_jH_{2j+1}\qquad\qquad\qquad\qquad\quad C_jH_{2j+1}$$

in which formula j represents an integer of from 18 to and 21 in average, l represents an integer of about 270 in average, and m represents an integer of 8 in average, and having a number average molecular weight of 17306, a diluted solution viscosity of 0.25 and a ratio $\{m[M(R^1O)+[M(R^2)\}/44\ l$ of 3.11.

The test results are shown in Table 5.

TABLE 6

| Example No. | Amount of polyoxyethylene polyether (wt %) | Amount of ionic compound (wt %) | Moisture absorption (20° C., 92% RH) Knitted fabric A L₀ | L₂₅ | Knitted fabric B L₀ | L₂₅ |
|---|---|---|---|---|---|---|
| Example 44 | 2 | — | 1.3 | 1.2 | 3.2 | 3.0 |
| Example 45 | 4 | — | 2.0 | 1.8 | 4.6 | 4.5 |
| Example 46 | 10 | — | 3.0 | 2.7 | 6.6 | 6.4 |
| Example 47 | 20 | — | 3.5 | 3.3 | 9.2 | 9.0 |
| Example 48 | 10 | — | 2.9 | 2.6 | 6.3 | 6.0 |
| Example 49 | 4 | 2 | 2.2 | 1.9 | 5.4 | 5.0 |
| Example 50 | 4 | 2 | 1.9 | 1.7 | 6.0 | 5.7 |
| Example 51 | 4 | 2 | 1.9 | 1.7 | 8.1 | 7.7 |
| Example 52 | 4 | 2 | 1.9 | 1.7 | 9.8 | 9.3 |
| Comparative Example 9 | (PEG # 8000) 4 | 2 | 1.7 | 0.9 | 2.0 | 0.8 |
| Comparative Example 10 | 4 | 2 | 1.2 | 1.0 | 1.1 | 0.6 |

We claim

1. A hydrophilic aromatic polyester fiber consisting of an aromatic polyester resin composition comprising (a) 100 parts by weight of an aromatic polyester resin and (b) 0.2 to 30 parts by weight of at least one water-insoluble polyoxyethylene polyether polymer, said water-insoluble polyoxyethylene polyether polymer satisfying all of the requirements (i) to (iii):

(i) the polyoxyethylene polyether polymer is a non-random copolymer type polyoxyethylene polyether polymer represented by the formula (I):

$$Z + (CH_2CH_2O)_l - (R^1O)_m - R^2]_k \quad (I)$$

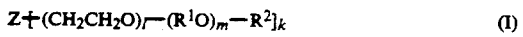

wherein Z is a residue of an organic compound having 1 to 6 active hydrogen atoms and a molecular weight of 300 of less, $R^1$ is an unsubstituted or substituted alkylene group having at least 6 carbon atoms, $R^2$ is a member selected from a hydrogen atom, monovalent hydrocarbon groups having 1 to 40 carbon atoms, and monovalent acyl groups having 2 to 40 carbon atoms, k is an integer of from 1 to 6, l is an integer satisfying the relationship of k x l ≧ 70, and m is an integer of 1 or more, (ii) the polyoxyethylene type polyether has a number average molecular weight of 5,000 to 16,000; and (iii) in the formula (I), $R^1$, $R^2$, l and m satisfy the following relationships:

when k is an integer of 1, $$0.4 < \frac{m[M(R^1O) + [M(R^2)]}{441} < 3.0$$

and
when k is an integer of 2 to 6, $$0.23 < \frac{m[M(R^1O)] + [M(R^2)]}{441} < 3.0$$

wherein $[M(R^1O)]$ represents the molecular weight of the radical $R^1O$ and $[M(R^2)]$ represents the molecular weight of the radical $R^2$.

2. The hydrophilic aromatic polyester fiber as set forth in claim 1, in which the aromatic polyester resin composition further comprises 0.05 to 10 parts by weight of an organic sulfonic acid salt which is substantially non-reactive to the aromatic polyester resin, per 200 parts by weight of the aromatic polyester resin.

3. The hydrophilic aromatic polyester fiber as set forth in claim 1, wherein the aromatic polyester resin contains an antimony compound as a polycondensation catalyst residue in a controlled amount of 30 ppm or less in terms of antimony atom.

4. The hydrophilic aromatic polyester fiber as set forth in claim 1, in which the aromatic polyester resin composition further comprises a phosphite type antioxidant in an amount of 0.02 to 3 parts by weight per 100 parts by weight of the aromatic polyester resin.

5. The hydrophilic aromatic polyester fiber as set forth in claim 1, wherein the aromatic polyester resin comprises at least one member selected from the group consisting of polyethylene terephthalate, polybutylene terephthalate, polyhexylene terephthalate, polyethylene naphthalate, polybutylene naphthalate, polyethylene-1,2-bis(phenoxy)ethane-4,4'-dicarboxylate, a polyethylene terephthalate/isophthalate copolymer, a polybutylene terephthalate/isophthalate copolymer and a polybutylene terephthalate/decane-dicarboxylate copolymer.

6. The hydrophilic aromatic polyester fiber as set forth in claim 1, wherein the organic compound residue represented by X in the formula (I) is selected from the group consisting of a methanol residue, a propanol residue, an ethanol residue, a butanol residue, a phenol residue, an ethylene glycol residue, a propylene glycol residue, a butylene glycol residue, a butane-diol residue, neopentyl glycol residue, a glycerol residue, a trimethylolpropane residue, a pentaerythritol residue, a sorbitol residue, a bisphenol A residue, a diglycerol residue, a triethanolamine residue, an ethylenediamine residue, a hexamethylenediamine residue and a diethylenetriamine residue.

7. The hydrophilic aromatic polyester fiber as set forth in claim 2, wherein the organic sulfonic acid salt is selected from the group consisting of sulfonates represented by the formula (II) to (V):

$$RSO_3M \quad (II)$$

$$RSO_3PR^3R^4R^5, R^6 \quad (III)$$

$$R^7O(R^8O)_n(CH_2)_pSO_3M \quad (IV)$$

and $$R^7O(R^8)_n(CH_2)_pSO_3PR^3R^4R^5R^6 \quad (V)$$
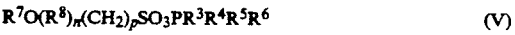

wherein R is a member selected from the group consisting of alkyl groups having 3 to 30 carbon atoms and aryl groups and alkyl aryl groups having 7 to 40 carbon atoms, M is a member selected from the group consisting of alkali metals, and $R^3$, $R^4$, $R^5$ and $R^6$ respectively and independently from each other is a member selected from the group consisting of alkyl groups and aryl groups, $R^7$ is a monovalent hydrocarbon group, $R^8$ is an alkylene group, n is a positive integer of 1 to 100 and p represents an integer of 2 to 4.

8. The hydrophilic aromatic polyester fiber as set forth in claim 1, which has a denier of 1 or less.

9. The hydrophilic aromatic polyester fiber as set forth in claim 1, which has a non-circular cross-sectional profile.

10. The hydrophilic aromatic polyester fiber as set forth in claim 1, which has a hollow cross-sectional profile.

11. The hydrophilic aromatic polyester fiber as set forth in claim 1, which has been treated with an aqueous alkali solution.

12. A moisture-absorbing polyester fiber which is a weight reduction treatment product of a fiber comprising the aromatic polyester composition as claimed in claim 1 with at least one member selected from an alkali compound and an amine compound, and has a moisture absorption of 3% by weight or more at a temperature of 20° C. and a relative humidity of 92%.

13. A conjugate fiber comprising as at least one component consisting of at least one aromatic polyester resin composition comprising (a) 100 parts by weight of an aromatic polyester resin and (b) 0.2 and 30 parts by weight of at least one water-insoluble polyoxyethylene polyether polymer, said water-insoluble polyoxyethylene polyether polymer satisfying all of the requirements (i) to (iii):

(i) the polyoxyethylene polyether polymer is a non-random copolymer type polyoxyethylene polyether polymer of the formula (I):

$$Z+(CH_2CH_2O)_l-(R^1O)_m-R^2]_k \qquad (I)$$

wherein Z is a residue of an organic compound having 1 to 6 active hydrogen atoms and a molecular weight of 300 or less, $R^1$ is an unsubstituted or substituted alkylene group having at least 6 carbon atoms, $R^2$ is a member selected from a hydrogen atom, a monovalent hydrocarbon groups having 1 to 40 carbon atoms, and monovalent acyl groups having 2 to 40 carbon atoms, and monovalent acyl groups having 2 to 40 carbon atoms, k is an integer of from 1 to 6, l is an integer satisfying the relationship of $k \times l \geq 70$, and m is an integer of 1 or more, (ii) the polyoxyethylene type polyether has a number average molecular weight of 5,000 to 16,000; and (iii) in the formula II), $R^1$, $R^2$, l and m satisfy the following relationships:

when k is an integer of 1, $$0.4 < \frac{m[M(R^1O) + [M(R^2)]}{441} < 3.0$$

and
when k is an integer of 2 to 6, $$0.23 < \frac{m[M(R^1O)] + [M(R^2)]}{441} < 3.0$$

wherein [M(R$^1$O)] represents the molecular weight of the radical R$^1$O and [M(R$^2$)] represents the molecular weight of the radical R$^2$.

14. The conjugate fiber as set forth in claim 13, in which the aromatic polyester resin composition further comprises 0.05 to 10 parts by weight of an organic sulfonic acid salt which is substantially non-reactive to the aromatic polyester resin, per 100 parts by weight of the aromatic polyester resin.

15. The conjugate fiber as set forth in claim 13, wherein the aromatic polyester resin contains an antimony compound as a polycondensation catalyst residue in a controlled amount of 30 ppm or less in terms of antimony atom.

16. The conjugate fiber as set forth in claim 13, in which the aromatic polyester resin composition further comprises a phosphite type antioxidant in an amount of 0.02 to 3 parts by weight per 100 parts by weight of the aromatic polyester resin.

17. The conjugate fiber as set forth in claim 13, wherein the aromatic polyester resin comprises at least one member selected from the group consisting of polyethylene terephthalate, polybutylene terephthalate, polyhexylene terephthalate, polyethylene naphthalate, polybutylene naphthalate, polyethylene-1,2-bis(phenoxy)ethane-4,4'-dicarboxylate, a polyethylene terephthalate/isophthatlate copolymer, a polybutylene terephthalate/isophthalate copolymer and a polybutylene terephthalate/decane-dicarboxylate copolymer.

18. The conjugate fiber as set forth in claim 13, wherein the organic compound residue represented by Z in the formula (I) is selected from the group consisting of a methanol residue, a propanol residue, an ethanol residue, a butanol residue, a phenol residue, an ethylene glycol residue, a propylene glycol residue, a butylene glycol residue, a butane-diol residue, a neopentyl glycol residue, a glycerol residue, a trimethylolpropane residue, a pentaerythritol residue, a sorbitol residue, a bisphenol A residue, a diglycerol residue, a treithanolamine residue, an ethylenediamine residue, a hexamethylenediamine residue and a diethylenetriamine residue.

19. The conjugate fiber as set forth in claim 14, wherein the organic sulfonic acid salt is selected from the group consisting of sulfonates of the formula (II) to (V):

$$RSO_3M \qquad (II)$$

$$RSO_3PR^3R^4R^5R^6 \qquad (III)$$

$$R^7O(R^8O)_n(CH_2)_pSO_3M \qquad (IV)$$

and $$R^7O(R^8O)_n(CH_2)_pSO_3PR^3R^4R^5R^6 \qquad (V)$$

20. The conjugate fiber as set forth in claim 13, which has a denier of 1 or less.

21. The conjugate fiber as set forth in claim 13, which has a non-circular cross-sectional profile.

22. The conjugate fiber as set forth in claim 13, which has a hollow cross-sectional profile.

23. The conjugate fiber as set forth in claim 13, which has been treated with an aqueous alkali solution.

24. A moisture-absorbing polyester fiber which is a weight reduction treatment product of a fiber comprising the aromatic polyester composition as claimed in claim 13, with at least one member selected from an alkali compound and an amine compound, and has a moisture absorption of 3% by weight or more at a temperature of 20° C. and a relative humidity of 92%.

* * * * *